United States Patent
Guo et al.

(10) Patent No.: US 11,981,150 B1
(45) Date of Patent: May 14, 2024

(54) PROCESSING EQUIPMENT, ELECTRODE PLATE PROCESSING EQUIPMENT, BATTERY PROCESSING EQUIPMENT, AND SHEET PROCESSING METHOD

(71) Applicant: CONTEMPORARY AMPEREX TECHNOLOGY CO., LIMITED, Ningde (CN)

(72) Inventors: Chao Guo, Ningde (CN); Yinyong Qiao, Ningde (CN)

(73) Assignee: CONTEMPORARY AMPEREX TECHNOLOGY CO., LIMITED, Ningde (CN)

( * ) Notice: Subject to any disclaimer, the term of this patent is extended or adjusted under 35 U.S.C. 154(b) by 0 days.

(21) Appl. No.: 18/220,781

(22) Filed: Jul. 11, 2023

Related U.S. Application Data

(63) Continuation of application No. PCT/CN2022/131182, filed on Nov. 10, 2022.

(51) Int. Cl.
*H01M 4/04* (2006.01)
*B41J 2/435* (2006.01)
(Continued)

(52) U.S. Cl.
CPC .............. *B41J 2/46* (2013.01); *B41J 2/435* (2013.01); *B41J 2/442* (2013.01); *B41J 2/471* (2013.01);
(Continued)

(58) Field of Classification Search
CPC .. H01M 4/04; H01M 10/0404; H01M 10/045; B41J 2/442; B41J 2/46;
(Continued)

(56) References Cited

U.S. PATENT DOCUMENTS

| | | | |
|---|---|---|---|
| 2015/0064387 A1* | 3/2015 | Imai | B32B 37/0046 156/251 |
| 2017/0035618 A1* | 2/2017 | Piantoni | B23K 26/032 |
| 2022/0016744 A1 | 1/2022 | Sven et al. | |

FOREIGN PATENT DOCUMENTS

| | | |
|---|---|---|
| CN | 207710107 U | 8/2018 |
| CN | 114905166 A | 8/2022 |

(Continued)

OTHER PUBLICATIONS

Chengdu Anticancer Bioscience, Ltd., PCT/CN2022/131182, International Search Report and Written Opinion, dated Mar. 24, 2023, 6 pgs.
(Continued)

*Primary Examiner* — Justin Seo
*Assistant Examiner* — Kendrick X Liu
(74) *Attorney, Agent, or Firm* — XSENSUS LLP

(57) ABSTRACT

This application discloses processing equipment, electrode plate processing equipment, battery processing equipment, and a sheet processing method. The processing equipment includes a rotation roller and a laser assembly. The rotation roller is rotatable around a first axis. An outer peripheral surface of the rotation roller around the first axis is configured to allow winding of a sheet. The outer peripheral surface of the rotation roller is able to move synchronously with the sheet around the first axis. The laser assembly is disposed on the rotation roller and able to rotate with the rotation roller. The laser assembly is configured to drive a laser beam to be emitted toward the sheet, and further configured to drive the laser beam to move linearly and/or oscillate around a second axis that intersects the first axis.

18 Claims, 10 Drawing Sheets

(51) Int. Cl.
    *B41J 2/44*         (2006.01)
    *B41J 2/46*         (2006.01)
    *B41J 2/47*         (2006.01)
    *B41J 2/475*       (2006.01)
    *B41J 3/413*       (2006.01)
    *B41J 11/00*       (2006.01)
    *B41J 15/02*       (2006.01)
    *B41J 15/04*       (2006.01)
    *B41J 29/02*       (2006.01)
    *B65H 20/02*      (2006.01)
    *H01M 10/04*      (2006.01)

(52) U.S. Cl.
    CPC ............. *B41J 2/4753* (2013.01); *B41J 3/413* (2013.01); *B41J 11/005* (2013.01); *B41J 15/02* (2013.01); *B41J 15/046* (2013.01); *B41J 29/02* (2013.01); *B65H 20/02* (2013.01); *H01M 4/04* (2013.01); *B65H 2404/143* (2013.01); *B65H 2404/19* (2013.01); *H01M 10/0404* (2013.01); *H01M 10/045* (2013.01)

(58) Field of Classification Search
    CPC . B41J 2/471; B41J 2/4753; B41J 3/413; B41J 11/005; B41J 15/02; B41J 15/046; B41J 29/02; B65H 20/02; B65H 2404/143; B65H 2404/412
    See application file for complete search history.

(56) References Cited

FOREIGN PATENT DOCUMENTS

| | | | |
|---|---|---|---|
| CN | 217412832 U | 9/2022 | |
| JP | 2003-334673 A | 11/2003 | |
| JP | 2003334673 A | * 11/2003 | |
| JP | 5271745 B2 | 8/2013 | |
| JP | 2016097611 A | * 5/2016 | ......... B29C 65/1648 |
| JP | 2020025969 A | * 2/2020 | |
| WO | 2023/285273 A2 | 1/2023 | |

OTHER PUBLICATIONS

Extended European Search Report issued Mar. 4, 2024 in European Patent Application No. 22905502.5.

* cited by examiner

PROCESSING EQUIPMENT, ELECTRODE PLATE PROCESSING EQUIPMENT, BATTERY PROCESSING EQUIPMENT, AND SHEET PROCESSING METHOD

CROSS-REFERENCE TO RELATED APPLICATIONS

The present application is a continuation of PCT Patent Application No. PCT/CN2022/131182, entitled "PROCESSING EQUIPMENT, ELECTRODE PLATE PROCESSING EQUIPMENT, BATTERY PROCESSING EQUIPMENT, AND SHEET PROCESSING METHOD" filed on Nov. 10, 2022, which is incorporated herein by reference in its entirety.

TECHNICAL FIELD

This application relates to the technical field of sheet processing, and in particular, to processing equipment, electrode plate processing equipment, battery processing equipment, and a sheet processing method.

BACKGROUND

In some circumstances, in a battery manufacturing process, it is usually necessary to perform laser marking on the electrode plate to facilitate subsequent operations such as stacking of electrode plates. However, currently it is difficult to control the position of the mark during laser marking on an electrode plate, thereby leading to a low precision of laser marking.

One of objectives of some embodiments of this application is to provide processing equipment, electrode plate processing equipment, battery processing equipment, and a sheet processing method to improve precision of the laser marking.

SUMMARY

The technical solutions provided in some embodiments of this application are as follows:

According to a first aspect, a piece of processing equipment is provided, including:
- a rotation roller, rotatable around a first axis, where an outer peripheral surface of the rotation roller around the first axis is configured to allow winding of a sheet, and the outer peripheral surface of the rotation roller is able to move synchronously with the sheet around the first axis; and
- a laser assembly, disposed on the rotation roller and able to rotate with the rotation roller, where the laser assembly is configured to drive a laser beam to be emitted toward the sheet, and further configured to drive the laser beam to move linearly and/or oscillate around a second axis that intersects the first axis.

According to a second aspect, a piece of electrode plate processing equipment is provided, including the processing equipment.

The foregoing technical solution enables the electrode plate processing equipment to possess advantages of high precision and high efficiency of laser marking or laser cutting.

According to a third aspect, a piece of battery processing equipment is provided, including:
- electrode plate processing equipment, configured to perform laser marking on an electrode plate; and
- stacking equipment, configured to stack the electrode plate.

According to a fourth aspect, a sheet processing method is provided, applicable to a piece of processing equipment, and including the following steps:
- winding a sheet around an outer peripheral surface of a rotation roller around a first axis;
- driving the sheet and the rotation roller to move synchronously around the first axis; and
- causing a laser assembly to drive a laser beam to be emitted toward the sheet.

BRIEF DESCRIPTION OF DRAWINGS

To describe the technical solutions in some embodiments of this application more clearly, the following outlines the drawings to be used in some embodiments or exemplary technical description. Evidently, the drawings outlined below are merely some embodiments of this application. A person of ordinary skill in the art may derive other drawings from such drawings without making any creative efforts.

REFERENCE NUMERALS

Figure 1:
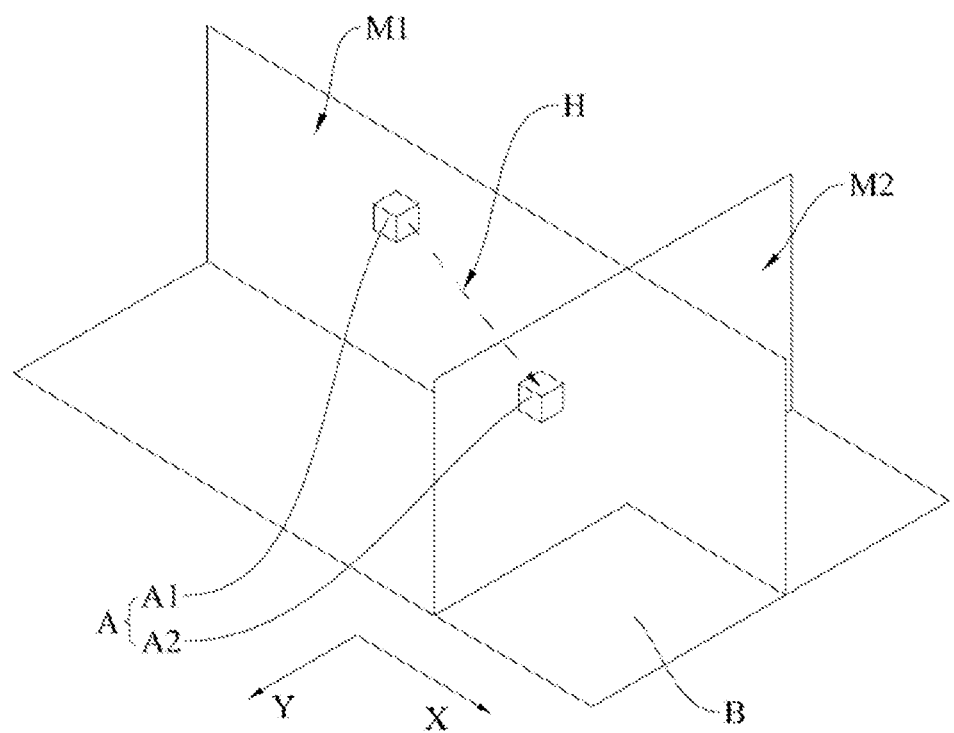
FIG. 1 is a schematic diagram of a laser beam that performs dynamic marking in the related art.

1000—electrode plate processing equipment; 2000—stacking equipment; 100—processing equipment; 200—sheet; 10—rack; 11—rack body; 12—connecting arm; 20—rotation roller; 201—accommodation space; 202—linear groove; 21—first housing; 22—second housing; 30—laser assembly; 31—fixing bracket; 32—galvo scanner; 33—F-Theta field lens; 34—first optical fiber; 35—first plug connector; 36—second plug connector; 37—cable; 40—first driving mechanism; 50—sheet driving mechanism; 60—second driving mechanism; 70—pressure roller; 80—motion channel; A—optical path tuning apparatus; A1—first galvo scanner; A2—second galvo scanner; B—electrode plate; M1—first rotation plane; M2—second rotation plane; L1—first axis; L2—second axis; S1—first plane; S2—second plane; S3—third plane; H—laser beam.

DETAILED DESCRIPTION OF EMBODIMENTS

The following describes some embodiments of this application in detail. Examples of the embodiments are shown in the drawings, throughout which the same or similar reference numerals represent the same or similar components or the components of the same or similar functions. The embodiments described below with reference to the drawings are exemplary, and are intended to construe this application but not to limit this application.

Understandably, in the description of this application, a direction or positional relationship indicated by the terms such as "length", "width", "up", "down", "front", "back", "left", "right", "vertical", "horizontal", "top", "bottom", "in", and "out" is a direction or positional relationship based on the illustration in the drawings, and is merely intended for ease or brevity of description of this application, but does not necessarily mean or imply that the indicated device or component is located in the specified direction or constructed or operated in the specified direction. Therefore, such terms are not to be understood as a limitation on this application.

In addition, the technical terms such as "first" and "second" are used merely for ease of description, but not to indicate or imply relative importance or implicitly specify the number of technical features mentioned. Therefore, a feature qualified by "first" or "second" may explicitly or implicitly include one such feature or a plurality of the features.

In the description of this application, unless otherwise expressly specified, "a plurality of" means at least two, and the term "at least two" includes two. Correspondingly, "a plurality of" means at least two, and includes two.

In the description of this application, unless otherwise expressly specified and defined, the technical terms such as "mounting", "concatenation", "connection", and "fixing" need to be understood in a broad sense, for example, understood as a fixed connection or a detachable connection or integrally formed; or understood as a mechanical connection or an electrical connection; understood as a direct connection, or an indirect connection implemented through an intermediary; or understood as internal communication between two components or interaction between two components. A person of ordinary skill in the art is able to understand the specific meanings of the terms in this application according to specific situations.

In the description of this application, the term "and/or" merely indicates a relationship between related items, and represents three possible relationships. For example, "A and/or B" may represent the following three circumstances: A alone, both A and B, and B alone. In addition, the character "/" herein generally indicates an "or" relationship between the item preceding the character and the item following the character.

A manufacturing process of the battery usually includes a step of winding or stacking a positive electrode plate and a negative electrode plate to form an electrode assembly. In a stacking process of the electrode plates, a film coating on the surface of an electrode plate is removed by laser marking on the electrode plate, so that a mark extending along a width direction of the electrode plate is formed on the surface of the electrode plate. Therefore, the electrode plate can be folded conveniently along the mark, thereby facilitating the stacking process of the electrode plate.

However, it is difficult to control the position of the mark during the laser marking on the electrode plate, thereby leading to a low precision of laser marking.

In some circumstances, the electrode plate is generally laser-marked when being conveyed, which is known as dynamic marking. In order to enable a laser beam to form a preset mark on the surface of the electrode plate, the laser beam possesses at least two freely moving orientations. In other words, the laser beam possesses at least two motion dimensions. One of the motion dimensions corresponds to the motion of the electrode plate so that the laser beam can move along with the electrode plate. The other motion dimension corresponds to the mark to be made, so that the laser beam makes a preset mark on the electrode plate.

In a process of dynamic marking, the laser beam generally moves synchronously with the electrode plate through an encoder. The encoder is prone to problems such as slipping and wear, resulting in abnormality of motion synchronization between the laser beam and the electrode plate. Moreover, the laser beam itself is also prone to problems such as zero drift. In this way, the motion synchronism between the laser beam and the electrode plate is prone to be inferior, thereby reducing the precision of laser marking of the electrode plate.

To solve the above technical problem, the applicant hereof finds that a buffer assembly may be disposed before and after a marking position of the electrode plate. When the electrode plate needs to be laser-marked, the buffer assembly causes the electrode plate in the marking position to be in a static state. In this way, the laser can perform laser marking when the electrode plate is in a static state, which is known as static marking. However, the buffer assembly for static marking needs to be started and shut down frequently, thereby limiting the overall speed of laser marking of the equipment and leading to low efficiency of laser marking, and in turn, reducing the production efficiency of the electrode plate.

Based on the above factors, the applicant has designed a piece of processing equipment after in-depth research, that is, the processing equipment mentioned in some embodiments of this application. In the processing equipment, the laser assembly moves synchronously with the electrode plate. Therefore, during laser marking on the electrode plate, there is no need to separately drive the laser beam to keep in sync with the electrode plate in motion. In contrast to the dynamic marking in the related art, this processing equipment improves motion synchronism between the laser beam and the electrode plate, and in turn, improves the precision of laser marking. In addition, in contrast to static marking, this processing equipment does not need to use a buffer assembly, and does not have to be frequently started and shut down, thereby improving the efficiency of laser marking.

Understandably, the processing equipment according to this application is also applicable to scenarios such as laser cutting or marking in other fields. The uses of the processing equipment are not limited in this application.

For ease of describing the technical solution of this application, a laser beam and laser marking are briefly described below:

A laser beam is a beam characterized by an extremely small beam angle, an extremely high degree of collimation (good directionality), and relatively concentrated energy. A laser beam for marking is approximately equivalent to a very narrow beam of high-energy parallel light.

An optical axis of the laser beam is a central axis of the laser beam in a transmission direction of the beam. If the shape of the laser beam is regarded as a cone, the optical axis of the laser beam may be regarded as a geometric central axis passing through an apex angle of the cone and perpendicular to the bottom face of the cone. An extension direction of the optical axis of the laser beam is basically identical to a projection direction, transmission direction, or extension direction of the laser beam. Therefore, the direction of the laser beam referred to in this embodiment is equivalent to the direction of the optical axis of the laser beam.

By using the characteristics such as high degree of collimation and high energy of the laser beam, laser marking projects the laser beam onto a surface of a medium, such as the surface of an electrode plate. A light spot struck by the laser beam on the electrode plate acts on the material of the electrode plate to result in a change of the material of the electrode plate. In this way, the laser beams are struck densely according to a preset pattern so as to form a mark of a preset shape.

Referring to FIG. 1, FIG. 1 is a schematic diagram of a laser beam H that performs dynamic marking in the related art. During dynamic marking, the laser beam H is projected onto the electrode plate B after being reflected by an optical path tuning apparatus A. For example, the optical path tuning apparatus A is a two-dimensional galvo scanner. The first galvo scanner A1 rotates in a first rotation plane M1, and is configured to reflect a laser beam H incident on a surface of the first galvo scanner. The first rotation plane M1 is parallel to a length direction of the electrode plate B, that is, the motion direction of the electrode plate B. The length direction of the electrode plate B is the direction X shown in the drawing. In this way, the laser beam H can move in the direction X along with the electrode plate B. The second galvo scanner A2 rotates in the second rotation plane M2, and is configured to reflect the laser beam H from the first galvo scanner A1 so that the laser beam H strikes the electrode plate B. The second rotation plane M2 is parallel to the width direction of the electrode plate B. The width direction of the electrode plate B is the direction Y shown in the drawing. In this way, the laser beam H can move along the direction Y of the electrode plate B to implement laser marking. Understandably, the laser beam H may be incident on the second galvo scanner A2 first instead, and then reflected to the first galvo scanner A1 by the second galvo scanner A2, and finally reflected onto the electrode plate B by the first galvo scanner A1, thereby also implementing laser marking. Evidently, the motion of the electrode plate B and the rotation of the first galvo scanner A1 affect the degree of synchronization between the laser beam H and the electrode plate B. If a high degree of synchronization fails to be achieved, the position of the light spot of the laser beam H that strikes the electrode plate B may deviate from a preset position by a distance ahead or behind, thereby impairing the precision of laser marking.

Figure 2:
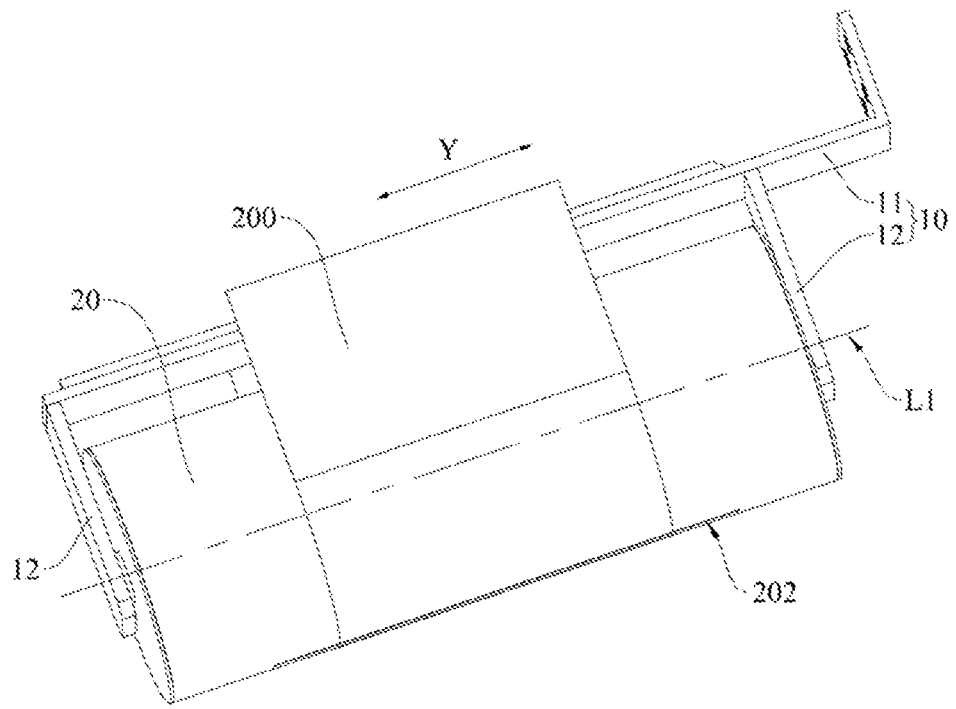
FIG. 2 is a three-dimensional schematic diagram of a fit between processing equipment and a sheet according to some embodiments of this application.

Referring to FIG. 1 and FIG. 2, a first aspect of some embodiments of this application provides a piece of processing equipment 100. The processing equipment 100 is primarily configured to perform laser marking on the electrode plate B to form a preset mark on the electrode plate B. Further, depending on actual application requirements, the processing equipment 100 may perform laser marking on other sheets 200 different from the electrode plate B, such as a separator. In addition, the processing equipment 100 may not only perform laser marking on the sheet 200, but also perform laser cutting on the sheet 200, and specifically, die-cut the sheet 200 to form a preset mark on the sheet 200.

Figure 3:
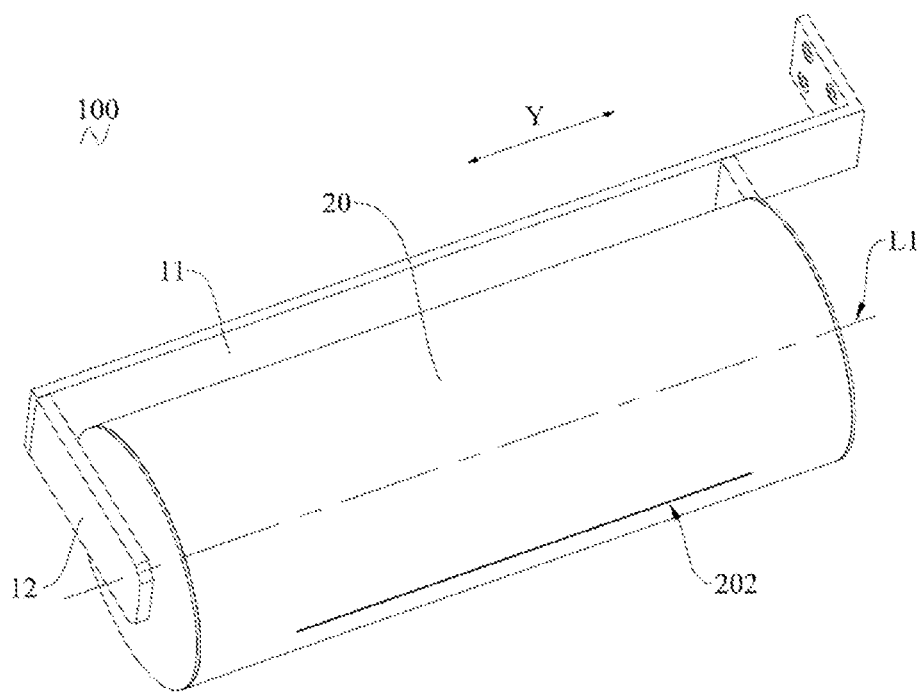
FIG. 3 is a three-dimensional schematic diagram of a piece of processing equipment according to some embodiments of this application.
Figure 4:
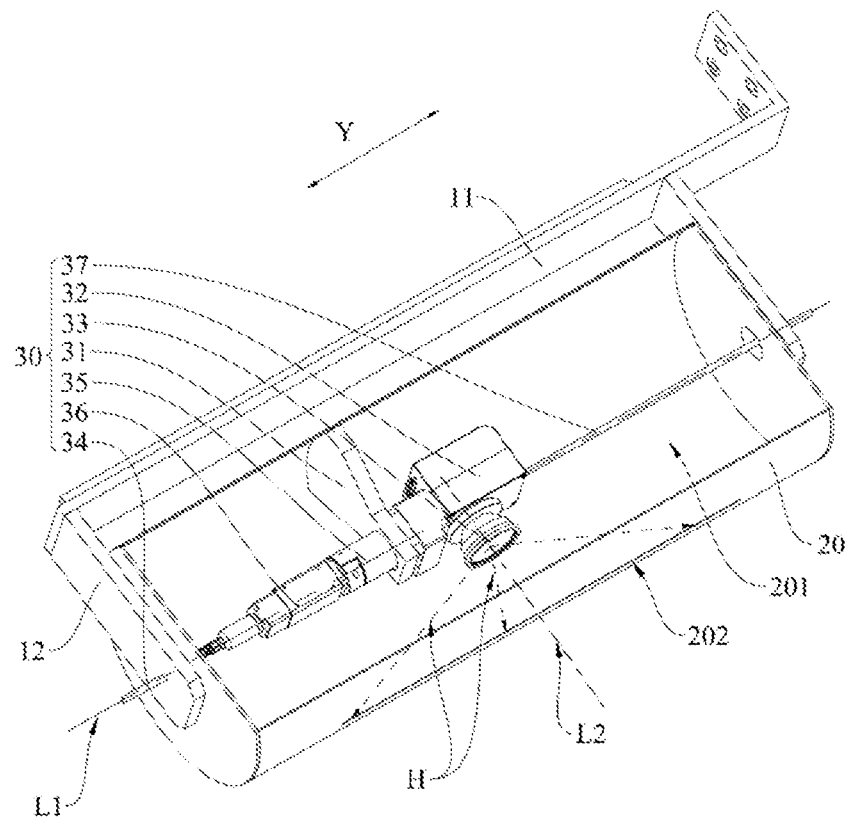
FIG. 4 is a local sectional view of a piece of processing equipment according to some embodiments of this application.

Referring to FIG. 2 to FIG. 4, the processing equipment 100 primarily includes a rotation roller 20 and a laser assembly 30. The rotation roller 20 can rotate around the first axis L1. An outer peripheral surface of the rotation roller 20 around the first axis L1 is configured to allow winding of a sheet 200. The outer peripheral surface of the rotation roller 20 is able to move synchronously with the sheet 200 around the first axis L1. The laser assembly 30 is disposed on the rotation roller 20 and can rotate around the first axis L1 along with the rotation roller 20. The laser assembly 30 is configured to drive the laser beam H to be emitted toward the sheet 200 so that the laser beam H performs laser marking or laser cutting on the sheet 200. The laser assembly 30 can also drive the laser beam H to move linearly; or, the laser assembly 30 can also drive the laser beam H to oscillate around the second axis L2; or, the laser assembly 30 can drive the laser beam H to move linearly on the basis of driving the laser beam H to oscillate around the second axis L2. The first axis L1 and the second axis L2 intersect.

The oscillation of the laser beam H and the linear movement of the laser beam H may be collectively referred to as the motion of the laser beam H.

When the sheet 200 is unfolded, the sheet 200 has a length direction and a width direction perpendicular to each other. The length direction of the sheet 200 is parallel to the motion direction of the sheet 200. As shown in FIG. 1 and FIG. 5 to FIG. 9, the width direction of the sheet 200 is the direction Y shown in the drawings, and the length direction of the sheet 200 is the direction X shown in the drawings.

The rotation roller 20 is a columnar structure with an outer peripheral surface being a cylindrical surface. The outer peripheral surface of the rotation roller 20 is a cylindrical surface so that the sheet 200 can be laid flat on the outer peripheral surface of the rotation roller 20 and can wind around the outer peripheral surface of the rotation roller 20. The first axis L1 means a central axis of the rotation roller 20. The rotation by the rotation roller 20 around the first axis L1 means that the rotation roller 20 rotates around the first axis L1 as a central axis. The first axis L1 is parallel to an axial direction of the rotation roller 20. The first axis L1 is parallel to the width direction of the sheet 200 when the sheet 200 winds around the outer peripheral surface of the rotation roller 20 around the first axis L1.

"The outer peripheral surface of the rotation roller 20 is able to move synchronously with the sheet 200 around the first axis L1" means that a part of the sheet 200, which winds around the outer peripheral surface of the rotation roller 20, can move synchronously with the rotation roller 20 around the first axis L1, but does not mean that all parts of the sheet 200 being conveyed move synchronously with the rotation roller 20 around the first axis L1. Understandably, the sheet 200 can move along the length direction of the sheet 200. In the motion direction of the sheet 200, the sheet 200 can continuously move around the rotation roller 20. The part that is of the sheet 200 and that winds around rotation roller 20 is wound around the outer peripheral surface of the rotation roller 20 around the first axis L1. In this way, the part that is of the sheet 200 and that winds around the outer peripheral surface of the rotation roller 20 can move around the first axis L1 along the outer peripheral surface of the rotation roller 20. In addition, the motion speed of the sheet 200 is identical to the rotating linear speed of the rotation roller 20, so that the part that is of the sheet 200 and that moves around the outer peripheral surface of the rotation roller 20 can move synchronously with the rotation roller 20 around the first axis L1.

The laser assembly 30 means an assembly capable of emitting a laser beam H at a preset angle. When the laser assembly 30 emits the laser beam H to the sheet 200, the emitted laser beam H can perform laser marking or laser cutting on the sheet 200. In some embodiments, the laser assembly 30 can adjust an emission angle of the laser beam H. To be specific, the laser assembly 30 can adjust the oscillation direction of the laser beam H so as to adjust the emission angle of the laser beam H and emit the laser beam H at a preset emission angle. Based on this, the laser assembly 30 can drive the laser beam H to oscillate to adjust the position of the light spot of the laser beam H on the sheet 200, thereby forming a plurality of continuous light spots on the sheet 200 to form marks of laser marking or laser cutting on the sheet 200. In some other embodiments, the laser assembly 30 can also adjust the emission position of the laser beam H against the sheet 200, so as to emit the laser beam H toward different positions on the sheet 200 at a preset angle. Based on this, the laser assembly 30 can drive the laser beam H to move linearly to adjust the position of the light spot of the laser beam H on the sheet 200, thereby forming a plurality of continuous light spots on the sheet 200 to form marks of laser marking or laser cutting on the sheet 200.

It is hereby noted that the laser assembly 30 being able to emit the laser beam H does not mean that the laser assembly 30 is able to generate laser light. Specifically, the laser assembly 30 is configured to be connected to an external laser system through lightguide. The external laser system primarily includes a laser generator configured to generate laser light. The laser generator is connected to the laser assembly 30 through lightguide. In some implementations, the laser generator is disposed outside the rotation roller 20. In some other implementations, the laser generator and the laser assembly 30 are both disposed on the rotation roller 20. Disposing the laser generator outside the rotation roller 20 can avoid the problem of unstable rotation of the rotation roller 20 caused by gravity of the laser generator, thereby improving the rotation stability of the rotation roller 20, and in turn, improving stability and precision of laser marking or laser marking.

During operation, the laser generator emits a laser beam H. The laser beam H is transmitted to the laser assembly 30 through lightguide. The laser assembly 30 receives the laser beam H emitted by the laser generator. Moreover, the laser assembly 30 drives the laser beam H to oscillate around the second axis L2, so as to adjust the emission angle of the laser beam H. In this way, the laser beam H is emitted to the sheet 200 at a preset emission angle, thereby forming marks on the sheet 200. Alternatively, the laser assembly 30 drives the laser beam H to move linearly, so as to adjust the emission position of the laser beam H against the sheet 200. In this way, the laser beam H is emitted to the sheet 200, thereby forming marks on the sheet 200. Alternatively, the laser assembly 30 alternately drives the laser beam H to oscillate around the second axis L2 and drives the laser beam H to move linearly, thereby forming a preset mark on the sheet 200. Understandably, on the basis that the laser assembly 30 is capable of both driving the laser beam H to oscillate around the second axis L2 and driving the laser beam H to move linearly, the laser assembly 30 may choose whether to drive the laser beam H to oscillate or to drive the laser beam H to move linearly depending on actual application requirements, so as to meet the requirement of making the desired marks.

It is hereby noted that the laser assembly 30 is disposed on the rotation roller 20 and can rotate along with the rotation roller 20. To be specific, when the laser assembly 30 is disposed on the rotation roller 20, the laser assembly 30 and the rotation roller 20 are relatively fixed. In this way, when the rotation roller 20 rotates around the first axis L1, the laser assembly 30 can rotate synchronously with the rotation roller 20 around the first axis L1. In this way, the laser assembly 30 can rotate synchronously with the rotation roller 20, and in turn, can move synchronously with a part of the sheet 200 around the first axis L1, where the part of the sheet winds around the outer peripheral surface of the rotation roller 20. Further, in laser marking or laser cutting on the sheet 200, it is not necessary to separately drive the laser beam H to move along with the sheet 200. As long as the laser assembly 30 remains fixed to the rotation roller 20 tightly, the oscillation of the laser beam H can be highly synchronized with the motion of the sheet 200.

The oscillation of the laser beam H around the second axis L2 means that the laser beam H oscillates left and right around the second axis L2, but the oscillation may be but without limitation a left-right symmetrical oscillation around the second axis L2. The laser assembly 30 drives the laser beam H to be emitted toward the sheet 200. When the laser beam H is driven to oscillate around the second axis L2, a spot track of the laser beam H striking the sheet 200 is a mark made by the laser beam H on the sheet 200.

The laser assembly 30 controls the laser beam H to oscillate around the second axis L2, so as to enable the laser beam H to make a preset mark on the sheet 200. As for how the laser beam H oscillates to make what marks on the sheet 200, examples will be given below, and details are omitted here.

The intersection between the second axis L2 and the first axis L1 specifically means that the first axis L1 is not parallel to the second axis L2. In other words, an angle greater than 0° and less than 1800 can be formed between the first axis L1 and the second axis L2.

The laser beam H moves linearly, and therefore, the position of the light spot of the laser beam H on the sheet 200 also moves linearly, so that the laser beam H can form marks on the sheet 200. The laser beam H may move linearly in a preset direction. In some embodiments, the direction in which the laser beam H moves linearly is parallel to the first axis L1, so that the marks formed by the laser beam H on the sheet 200 are linear marks and parallel to the first axis L1. Definitely, in some other embodiments, the laser beam H can also move linearly along a direction that intersects the first axis L1, so as to form a linear mark on the sheet 200, where the linear mark intersects the first axis L1. In still some other embodiments, the laser beam H can move linearly in different directions sequentially, so as to form fold line marks on the sheet 200. As regards what marks can be formed on the sheet 200 by the linear movement of the laser beam H, the marks can be designed depending on actual application requirements, without being enumerated exhaustively herein.

The processing equipment 100 according to some embodiments of this application achieves the following effects:

First, when the rotation roller 20 rotates around the first axis L1, the laser assembly 30 rotates synchronously with the rotation roller 20 around the first axis L1, so that the laser beam H can move synchronously with the sheet 200. A light spot of the laser beam H acting on the sheet 200 is basically prevented from deviating from a preset position, thereby implementing the effect of "static marking" during the motion of the sheet 200. At the same time, the laser beam H oscillates around the second axis L2 at a preset angle and in a preset direction, or the laser beam H moves linearly in a preset direction, so that the laser beam H can form a preset mark on the sheet 200 while moving along with the sheet 200. In this way, the processing equipment 100 just needs to drive the laser beam H to oscillate around the second axis L2, or drive the laser beam H to move linearly, or alternately drive the laser beam H to oscillate and drive the laser beam H to move linearly, so as to implement laser marking or laser cutting without a need to drive the laser beam H to move along with the sheet 200, thereby improving the motion synchronism between the laser beam H and the sheet 200, and in turn, improving the precision and efficiency of laser marking.

Second, the buffer assembly in the relevant static marking technology is omitted, thereby avoiding the problems of slow speed and low efficiency of laser marking of the sheet 200 caused by frequent start and shutdown of the buffer assembly.

In addition, the problem of zero drift of the laser beam caused by the complex motion of the laser beam H is alleviated, thereby improving the precision of laser marking.

Moreover, the omission of the buffer assembly in the relevant static marking technology brings the following effects: on the one hand, the omission of the buffer assembly avoids the problems of a complex structure and a large size of the processing equipment 100 caused by the buffer assembly and the driving mechanism configured to drive the buffer assembly to move. On the other hand, the omission of the buffer assembly avoids the problem of wear and tear of the processing equipment 100 caused by the frequent start and shutdown of the buffer assembly. Third, the omission of the buffer assembly avoids the problem of violent fluctuations of the tension of the sheet 200 caused by the frequent start and shutdown of the buffer assembly, thereby improving the precision of laser marking of the sheet 200.

The first axis L1 and the second axis L2 may be located in the same plane or in different planes.

Figure 5:
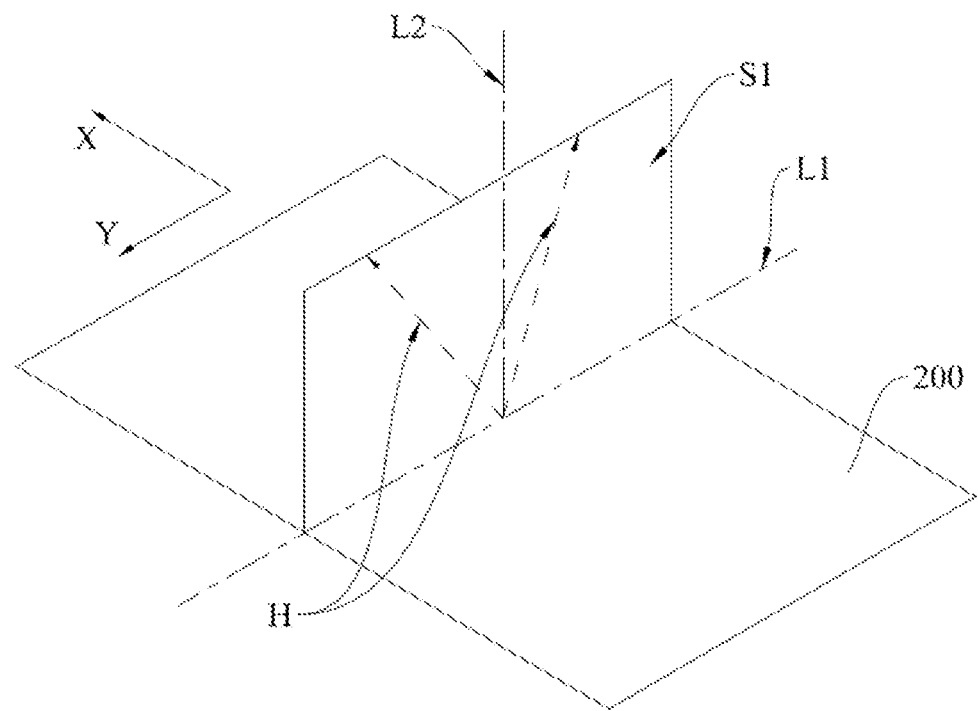
FIG. 5 is a schematic diagram of a laser beam of a piece of processing equipment according to some embodiments of this application.

In some embodiments, referring to FIG. 4 and FIG. 5, FIG. 5 is a schematic diagram of a laser beam H according to some embodiments of this application. When the first axis L1 and the second axis L2 are located in the same plane, the first axis L1 intersects the second axis L2 to define a first plane S1. The laser assembly 30 is able to drive the laser beam H to oscillate in the first plane S1.

Understandably, the first plane S1 is a plane defined by the first axis L1 and the second axis L2.

In this case, the oscillation of the laser beam H around the second axis L2 may mean that the laser beam H oscillates left and right around the second axis L2 in the first plane S1, but the oscillation is not limited to a left-right symmetrical oscillation.

Figure 6:
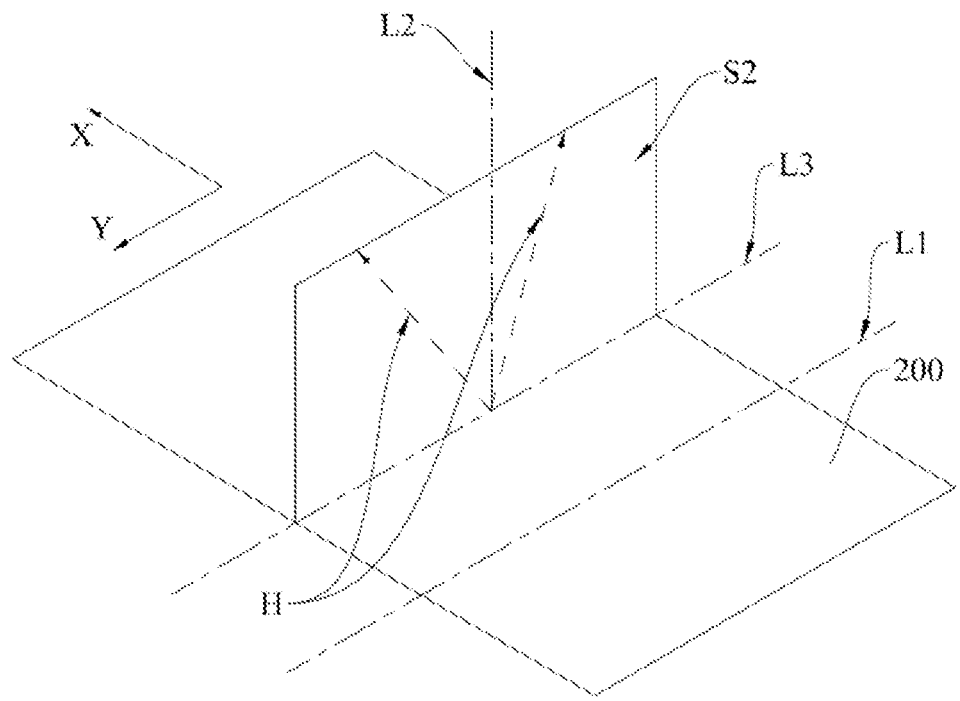
FIG. 6 is a schematic diagram of a laser beam of a piece of processing equipment according to some other embodiments of this application.

In some other embodiments, referring to FIG. 4 and FIG. 6, FIG. 6 is a schematic diagram of a laser beam H according to some other embodiments of this application. When the first axis L1 and the second axis L2 are located in different planes, that is, when the first axis L1 and the second axis L2 are straight lines in different planes, a third axis L3 parallel to the first axis L1 may be made, and the third axis L3 intersects the second axis L2 to define a second plane S2. The laser assembly 30 is able to drive the laser beam H to oscillate in the second plane S2. Understandably, the second plane S2 is a plane defined by the second axis L2 and a third axis L3. The third axis L3 is a straight line parallel to the first axis L1 and intersecting the second axis L2.

In this case, the oscillation of the laser beam H around the second axis L2 may mean that the laser beam H oscillates left and right around the second axis L2 in the second plane S2, but the oscillation is not limited to a left-right symmetrical oscillation.

As shown in FIG. 4 to FIG. 6, when the laser assembly 30 drives the laser beam H to be emitted toward the sheet 200, the laser assembly 30 drives the laser beam H to oscillate around the second axis L2 in the first plane S1 or the second plane S2. Because the first axis L1 falls in the first plane S1 and the first axis L1 is parallel to the second plane S2, both the first plane S1 and the second plane S2 are parallel to the width direction of the sheet 200. Moreover, the second axis L2 is located in the first plane S1 or the second plane S2. Therefore, the laser beam H oscillates around the second axis L2 in the first plane S1 or the second plane S2, and the track of the light spot on the sheet 200 is always a linear mark. The linear mark is parallel to the first axis L1, that is, parallel to the width direction of the sheet 200, and is suitable for transverse marking or transverse die-cutting of the sheet 200.

The oscillation of the laser beam H around the second axis L2 in the first plane S1 or the second plane S2 may be left-right symmetrical with respect to the second axis L2 or may be left-right asymmetrical, without affecting the spot track, that is, without affecting the shape of the mark. Definitely, when the laser beam H oscillates around the second axis L2 in the first plane S1 or the second plane S2 by oscillating symmetrically left and right around the second axis L2, it is convenient to control the projection direction of the laser beam H.

The foregoing technical solution enables the laser beam H to oscillate around the second axis L2 in the first plane S1 or the second plane S2, thereby forming a linear mark that extends along the width direction on the sheet 200, that is, implementing transverse marking or transverse die-cutting on the sheet 200.

In some embodiments, referring to FIG. 4 and FIG. 7 to FIG. 9, the laser assembly 30 is able to drive the laser beam H to oscillate in a third plane S3. The third plane S3 is a plane passing through the second axis L2 and intersecting the first axis L1.

When the laser assembly 30 drives the laser beam H to be emitted toward the sheet 200, the laser beam H may tilt at an angle to the first plane S1 or the second plane S2 and oscillate around the second axis L2 without oscillating around the second axis L2 in the first plane S1 or the second plane S2. In other words, the laser beam H oscillates around the second axis L2 and is emitted at an angle to the first plane S1 or the second plane S2. In this case, the laser beam H and the second axis L2 define the third plane S3. The third plane S3 defined by the laser beam H and the second axis L2 is neither parallel to the first plane S1 nor parallel to the first axis L1, and the third plane S3 intersects the first axis L1. The laser beam H oscillates around the second axis L2 in the third plane S3. In this case, the oscillation of the laser beam H around the second axis L2 may mean that the laser beam H oscillates left and right around the second axis L2 in the third plane S3, but the oscillation is not limited to a left-right symmetrical oscillation. Therefore, the laser beam H oscillates around the second axis L2 in the third plane S3, and the track of the light spot on the sheet 200 is not parallel to the first axis L1, that is, not parallel to the width direction of the sheet 200. Correspondingly, the mark formed by the laser beam H on the sheet 200 is neither parallel to the first axis L1 nor parallel to the width direction of the sheet 200.

Figure 7:
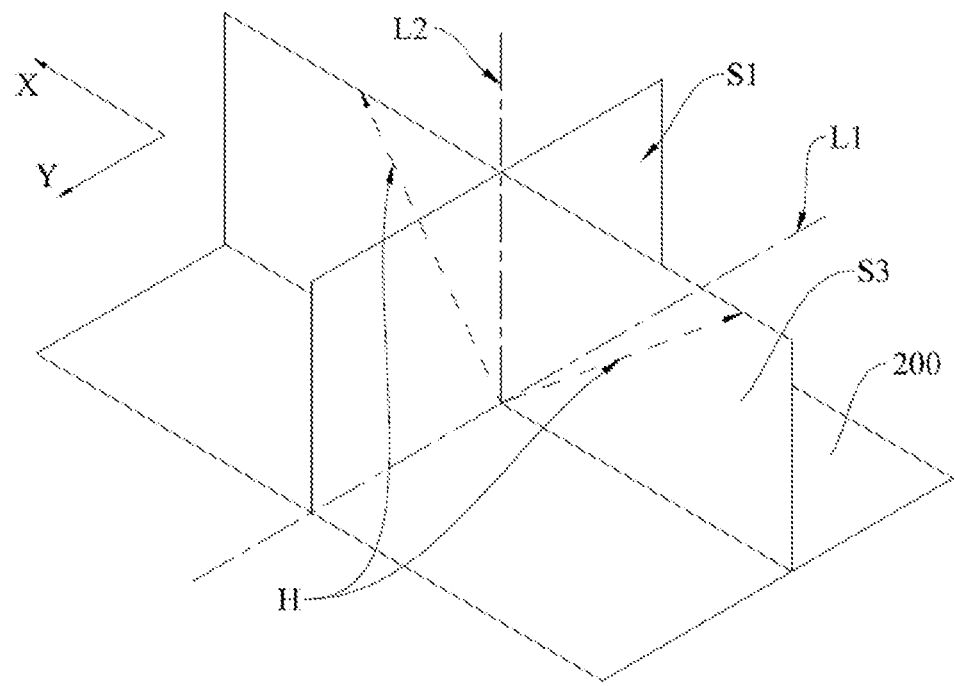
FIG. 7 is a schematic diagram of a laser beam of a piece of processing equipment according to some other embodiments of this application.
Figure 8:
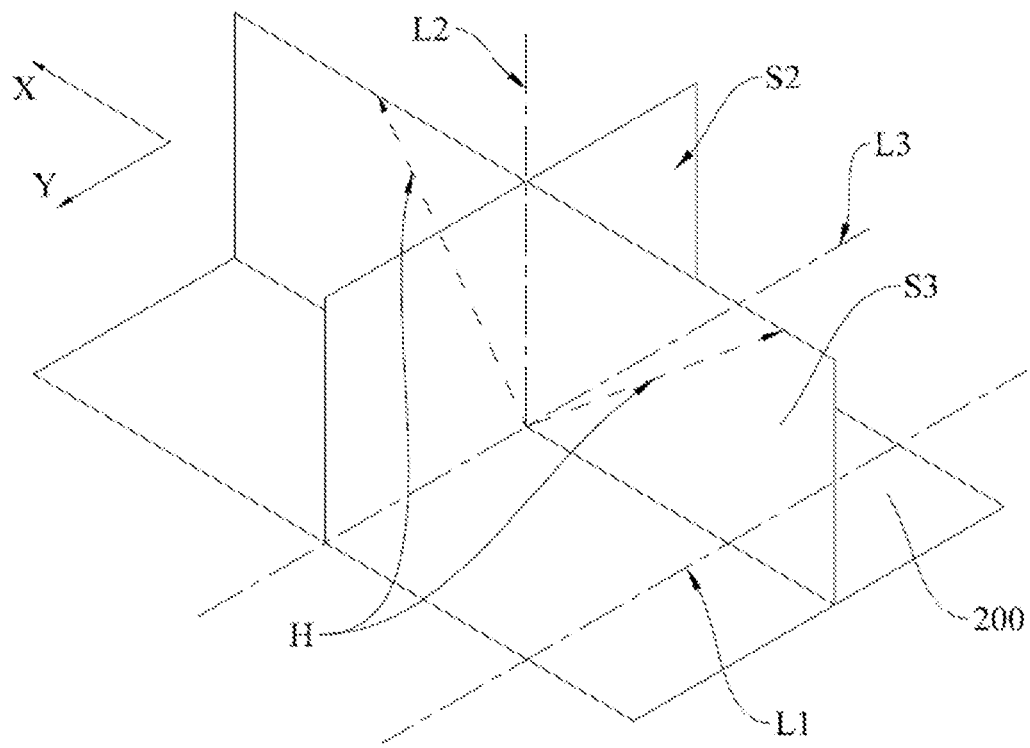
FIG. 8 is a schematic diagram of a laser beam of a piece of processing equipment according to some other embodiments of this application.

As an example, as shown in FIG. 7 and FIG. 8, when the third plane S3 is parallel to the length direction or the motion direction of the sheet 200, the laser beam H can form, on the sheet 200, a mark parallel to the length direction of the sheet 200, and may be configured to perform longitudinal marking or longitudinal die-cutting of electrode plates. As shown in FIG. 7, the first axis L1 intersects the second axis L2, the first axis L1 intersects the third plane S3, the second axis L2 falls into the third plane S3, and the third plane S3 is parallel to the length direction of the sheet 200, that is, the direction X shown in the drawing. In this case, the laser beam H can form, on the sheet 200, a mark parallel to the length direction of the sheet 200. As shown in FIG. 8, the first axis L1 and the second axis L2 are straight lines in different planes. Both the first axis L1 and the third axis L3 intersect the third plane S3. The second axis L2 falls into the third plane S3, and the third plane S3 is parallel to the width direction of the sheet 200, that is, the direction Y shown in the drawing. In this case, the laser beam H can form, on the sheet 200, a mark parallel to the width direction of the sheet 200.

Figure 9:
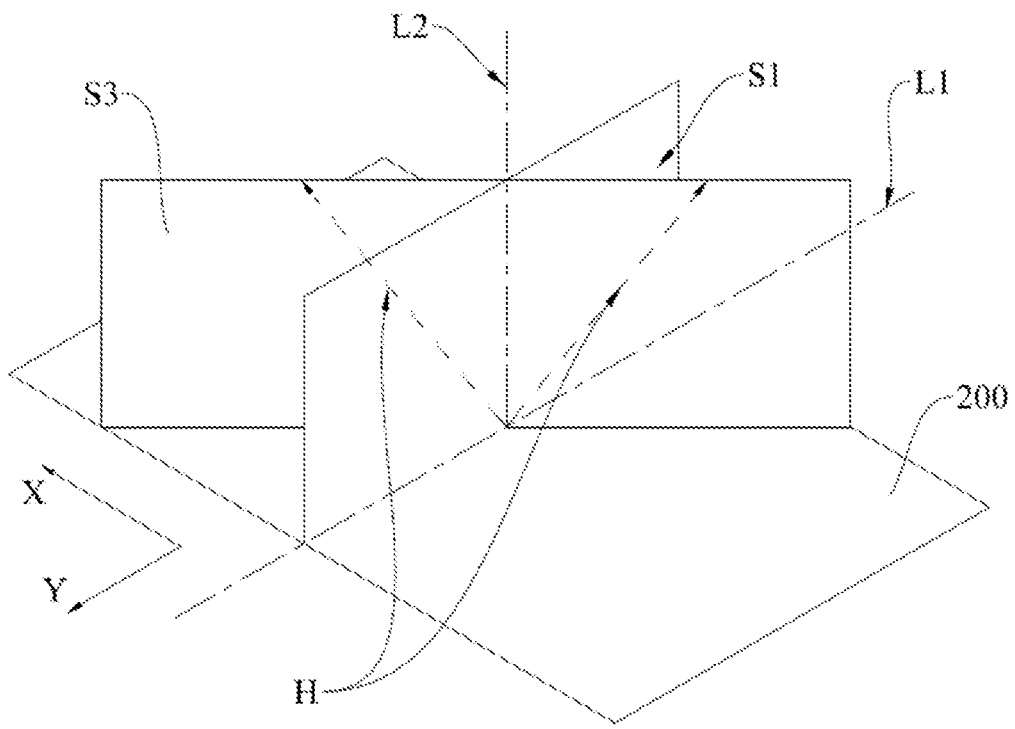
FIG. 9 is a schematic diagram of a laser beam of a piece of processing equipment according to some other embodiments of this application.

As an example, as shown in FIG. 9, when the third plane S3 is neither parallel to the length direction of the sheet 200 nor parallel to the width direction of the sheet 200, the laser beam H can form an angled mark on the sheet 200, thereby implementing angled marking or angled die-cutting. To be specific, as shown in FIG. 9, the first axis L1 intersects the second axis L2, the third plane S3 intersects the first axis L1, the second axis L2 falls into the third plane S3, and the third plane S3 intersects the length direction of the sheet 200 and the width direction of the sheet 200 separately. In this case, the laser beam H can form an angled mark on the sheet 200. In addition, when the first axis L1 and the second axis L2 are straight lines in different planes, the laser beam H can also form an angled mark on the sheet 200.

The foregoing technical solution enables the laser beam H to oscillate in the third plane S3 to perform longitudinal marking (or longitudinal die-cutting) or angled marking (or angled die-cutting) on the sheet 200.

The word "transverse" in transverse marking or transverse die-cutting means a direction parallel to the width direction of the sheet 200. The word "longitudinal" in longitudinal marking or longitudinal die-cutting means a direction parallel to the length direction of the sheet 200 in an unfolded state. The word "angled" in angled marking or angled die-cutting means a direction that tilts at an angle to both the longitudinal direction and the transverse direction.

In addition, based on the above structure, the laser assembly 30 may further control the laser beam H to oscillate around the second axis L2 in at least two dimensions, that is, oscillate in different planes (for example, the first plane S1, the second plane S2, and the third plane S3) over time, so as to implement fold line marking, curve marking, and the like.

For example, the laser assembly 30 may drive the laser beam H to sequentially oscillate in three different third planes S3, so that the laser beam H forms a triangular mark on the sheet 200. Definitely, the specific shape of the mark may be set according to actual needs, and is not enumerated exhaustively herein. Although this marking method is more complex than driving the laser beam H in linear marking, this marking method eliminates the motion dimension of the sheet 200 in the motion direction. Compared with the dynamic marking in the related art, this marking method can still improve the precision and efficiency of laser marking.

Understandably, when the laser assembly 30 drives the laser beam H to oscillate around the second axis L2 in the same plane (for example, the first plane S1, the second plane S2, or the third plane S3), the laser beam H always forms a linear mark on the sheet 200. When the laser assembly 30 drives the laser beam H to oscillate in different planes, the laser beam H can form a fold line mark, a curve mark, or the like on the sheet 200.

To sum up, by controlling the laser beam H to oscillate around the second axis L2, the laser assembly 30 can implement various forms of marking such as horizontal marking, angled marking, longitudinal marking, fold line marking, and curve marking.

Figure 10:
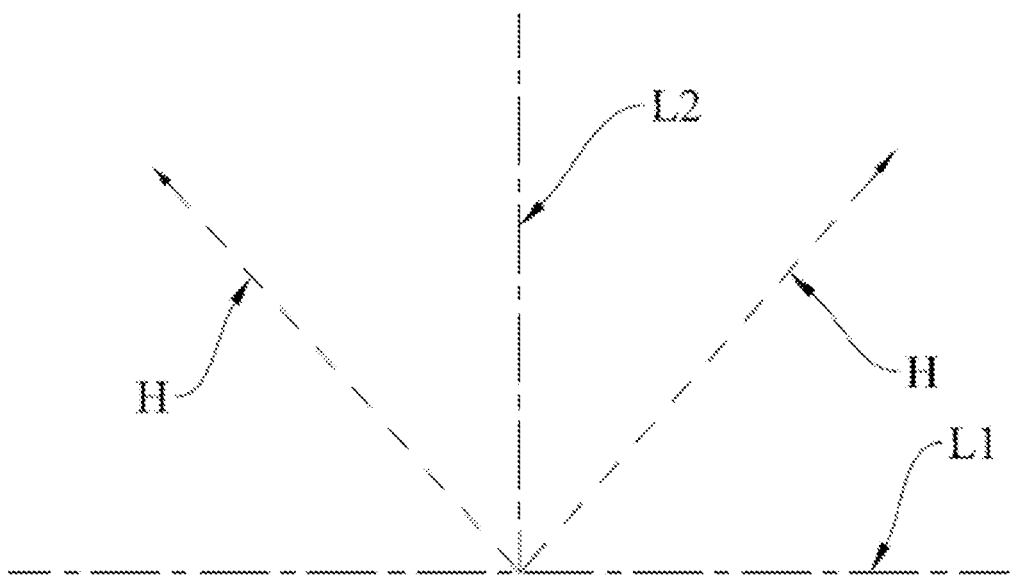
FIG. 10 is a schematic diagram of a laser beam of a piece of processing equipment according to some embodiments of this application.

In some embodiments, as shown in FIG. 10, the second axis L2 is perpendicular to the first axis L1. In this way, it is convenient to make the laser beam H oscillate symmetrically left and right around the second axis L2. Optionally, the angles of both leftward and rightward oscillations of the laser beam H around the second axis L2 may be set to 90°, 80°, 75°, or another appropriate value.

Figure 11:
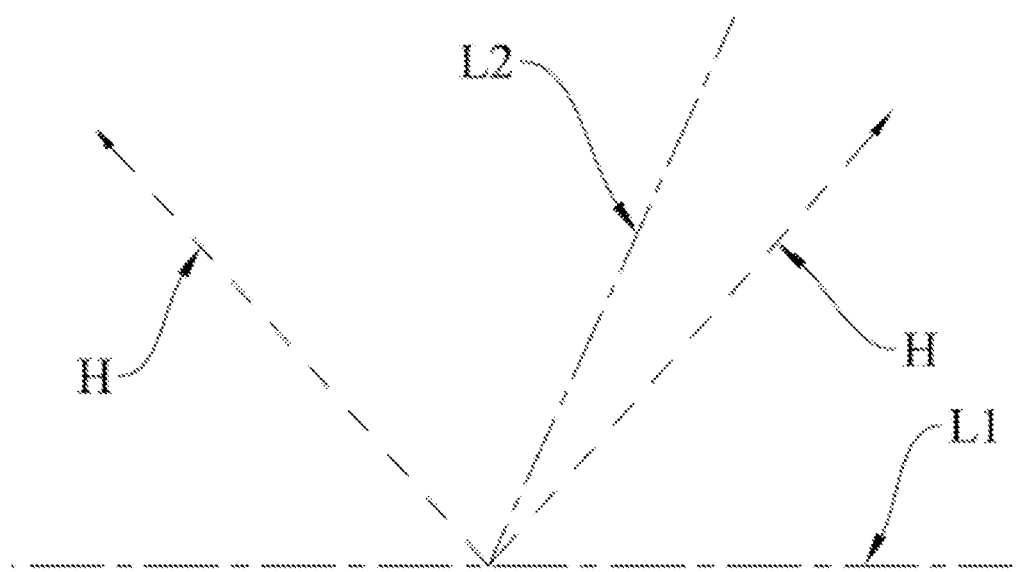
FIG. 11 is a schematic diagram of a laser beam of a piece of processing equipment according to some other embodiments of this application.

Definitely, in some other embodiments, as shown in FIG. 11, the second axis L2 may be not perpendicular to the first axis L1. In this case, the angle of leftward oscillation of the laser beam H around the second axis L2 may be different from the angle of rightward oscillation. For example, the angle of oscillation of the laser beam H toward one of the left or right side is 120°, and the angle of oscillation toward the other side is 60°. Alternatively, the angle of oscillation of the laser beam H toward one of the left or right side is 100°, and the angle of oscillation toward the other side is 75°, or the like, without being strictly limited herein.

Optionally, in some embodiments, the laser assembly 30 may be capable of moving linearly on the rotation roller 20 to implement linear movement of the laser beam H, so that the emission position of the laser beam H against the sheet 200 is tunable. Specifically, during operation, the laser assembly 30 may move linearly against the rotation roller 20 so as to move linearly against the sheet 200, and in turn, form a linear mark on the sheet 200.

Optionally, a slide rail may be disposed on the rotation roller 20. The laser assembly 30 is slidably disposed on the slide rail. In this way, the laser assembly 30 can move linearly against the rotation roller 20 to implement linear movement of the laser beam H. Moreover, the design of the slide rail needs relative fixing between the slide rail and the laser assembly 30, so that the laser assembly 30 can rotate synchronously with the rotation roller 20 when the rotation roller 20 rotates around the first axis L1.

Based on the foregoing technical solution, the laser assembly 30 can move linearly against the rotation roller 20 to implement the linear movement effect of the laser beam H.

In some embodiments, referring to FIG. 2 to FIG. 4, the laser assembly 30 is disposed inside the rotation roller 20. A conduit 202 is made in the rotation roller 20. The conduit 202 is configured to allow passage of the laser beam H.

As shown in FIG. 3 and FIG. 4, an accommodation space 201 is made inside the rotation roller 20. The accommodation space 201 is configured to accommodate the laser assembly 30. The conduit 202 communicates with the accommodation space 201 inside the rotation roller 20 and is exposed outside the rotation roller 20. In addition, when the sheet 200 winds around the outer peripheral surface of the rotation roller 20 around the first axis L1, the conduit 202 directly faces the sheet 200. An emergent side of the laser assembly 30 is disposed toward the conduit 202.

When the processing equipment 100 is in operation, the sheet 200 winds around the rotation roller 20 and covers at least a part of the conduit 202. In this way, the laser assembly 30 can drive the laser beam H to be emitted toward the conduit 202. The laser beam H passes through the conduit 202, and performs laser marking or laser cutting on the sheet 200 that covers the conduit 202.

The shape of the conduit 202 may be designed according to the shape of the preset mark, and specifically, may be the shape of a straight line, a curve, or a fold line. As shown in FIG. 3 and FIG. 4, the conduit 202 is a linear groove. Definitely, in some other embodiments, the shape may be designed according to the shape of the preset mark, without being limited herein.

In the foregoing technical solution, the laser assembly 30 is disposed inside the rotation roller 20. In this way, the laser beam H is able to pass through the conduit 202 to perform laser marking or laser cutting on the sheet 200, thereby achieving a protection effect on the laser assembly 30.

Optionally, as shown in FIG. 3 and FIG. 4, the laser assembly 30 may be disposed on an inner peripheral side of the rotation roller 20. In this way, the emergent side of the laser assembly 30 can face the conduit 202 more accurately, so that the laser beam H can be emitted onto the sheet 200 toward the conduit 202. Definitely, in some other embodiments, the laser assembly 30 may be disposed at an upward axial end of the rotation roller 20.

In some embodiments, referring to FIG. 2 to FIG. 4, there is one conduit 202.

When the processing equipment 100 is in operation, the sheet 200 winds around the outer peripheral surface of the rotation roller 20 and covers a part of the conduit 202. During rotation of the rotation roller 20 for one circle, the laser assembly 30 keeps driving the laser beam H to pass through the conduit 202 to perform laser marking or laser cutting on the same position on the sheet 200. When the rotation roller 20 proceeds to rotate for a next circle, the laser assembly 30 drives the laser beam H to pass through the conduit 202 to perform laser marking or laser cutting on a next position on the sheet 200.

Based on the foregoing technical solution, during rotation of the rotation roller 20 for one circle, the laser assembly 30 drives the laser beam H to perform laser marking or laser cutting on the same position on the sheet 200. With such an arrangement, on a condition that the position for laser marking or laser cutting on the sheet 200 is predetermined, the diameter of the rotation roller 20 can be reduced to downsize the processing equipment 100. Correspondingly, on a condition that the diameter of the rotation roller 20 is predetermined, the time for the laser beam H to perform laser marking or laser cutting for each position on the sheet 200 can be extended, thereby improving quality of the marks formed on the sheet 200.

In some embodiments, the conduit 202 may be plural in number, and the plurality of conduits 202 are spaced out in the rotation roller 20.

The plurality of conduits 202 may be spaced out along any direction. As an example, the extension direction of the conduits 202 is parallel to the first axis L1, and the plurality of conduits 202 are sequentially distributed on the rotation roller 20 around the first axis L1 circumferentially.

Based on the foregoing technical solution, when the processing equipment 100 is in operation, the sheet 200 winds around the outer peripheral surface of the rotation roller 20 and covers the plurality of conduits 202. During rotation of the rotation roller 20 for one circle, the laser beam H is emitted to one of the conduits 202 first, so that the laser beam H performs laser marking or laser cutting on the corresponding position on the sheet 200 through the conduit 202. Subsequently, the laser beam H is emitted toward a next conduit 202, so that the laser beam H performs laser marking or laser cutting on a next corresponding position on the sheet 200 through the conduit 202, and so on. With such an arrangement, a plurality of conduits 202 spaced apart are made in the rotation roller 20. Therefore, during rotation of the rotation roller 20 for one circle, laser marking or laser cutting can be implemented at a plurality of different positions on the sheet 200, thereby improving the processing efficiency of the sheet 200 and improving the production efficiency of the sheet 200.

In some embodiments, the laser assembly 30 is configured to sequentially drive the laser beam H to be emitted toward a plurality of conduits 202.

The laser assembly 30 can drive the laser beam to oscillate, so that the laser assembly 30 emits the laser beam toward any one of the plurality of conduits 202.

When the processing equipment 100 is in operation, the sheet 200 winds around the outer peripheral surface of the rotation roller 20 and covers the plurality of conduits 202. During rotation of the rotation roller 20 for one circle, the laser assembly 30 drives the laser beam H to be emitted toward one of the conduits 202 first, so that the laser beam H performs laser marking or laser cutting on the corresponding position on the sheet 200 through the conduit 202. Subsequently, the laser assembly 30 drives the laser beam H to oscillate around the second axis L2, so that the laser beam H is emitted toward a next conduit 202, and so that the laser beam H performs laser marking or laser cutting on a next corresponding position on the sheet 200 through the conduit 202, and so on. During rotation of the rotation roller 20 for one circle, the laser assembly 30 can drive the laser beam H to sequentially perform laser marking or laser cutting on a plurality of different positions on the sheet 200.

Alternatively, in some other embodiments, the laser assembly 30 is plural in number. The plurality of laser assemblies 30 are configured to drive the laser beam H to be emitted to the corresponding conduits 202.

The emergent sides of the plurality of laser assemblies 30 are oriented toward a plurality of conduits 202 in one-to-one correspondence.

When the processing equipment 100 is in operation, the sheet 200 winds around the outer peripheral surface of the rotation roller 20 and covers the plurality of conduits 202. During rotation of the rotation roller 20 for one circle, each laser assembly 30 emits the laser beam H toward a corresponding conduit 202, so as to perform laser marking or laser cutting on the corresponding position on the sheet 200. In other words, the laser beams H emitted by the plurality of laser assemblies 30 can pass through the corresponding conduits 202. In this way, during rotation of the rotation roller 20 for one circle, the laser beams can implement the laser marking or laser cutting on a plurality of different positions on the sheet 200 respectively.

Based on the foregoing technical solution, the laser assembly 30 can drive the laser beam H to pass through the plurality of conduits 202 sequentially, so as to sequentially perform laser marking or laser cutting on a plurality of different positions on the sheet 200. Alternatively, a plurality of laser assemblies 30 can drive the laser beam H to pass through the corresponding conduit 202, so as to perform laser marking or laser cutting at a plurality of different positions on the sheet 200 simultaneously. In this way, the processing efficiency of the sheet 200 is improved, and in turn, the production efficiency of the sheet 200 is improved.

Figure 16:
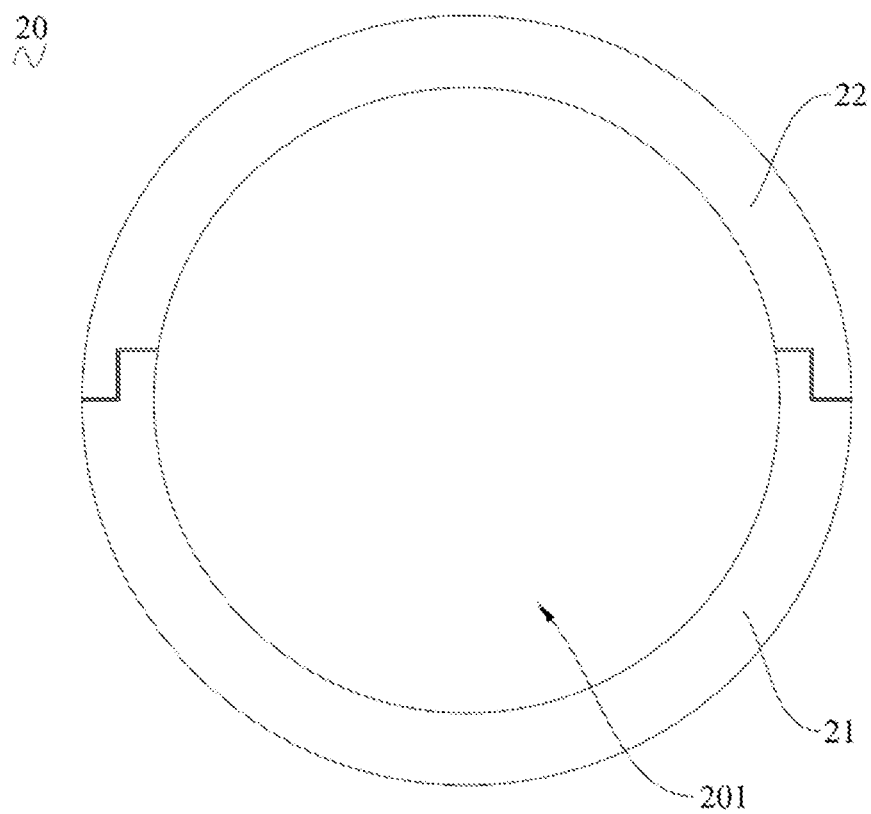
FIG. 16 is a sectional view of a rotation roller according to some embodiments of this application.

In some embodiments, referring to FIG. 4 and FIG. 16, the rotation roller 20 includes a first housing 21 and a second housing 22. The second housing 22 is detachably connected to the first housing 21, and combines with the first housing 21 to jointly define an accommodation space 201. The accommodation space 201 is configured to accommodate the laser assembly 30. The conduit 202 is made in the first housing 21, or the conduit 202 is made in the second housing 22, or the conduit 202 is made in the first housing 21 and the second housing 22. Alternatively, the conduit 202 is made in both the first housing 21 and the second housing 22. In addition, the conduit 202 communicates with the accommodation space 201.

The rotation roller 20 may be of diverse structures. For example, the first housing 21 is a hollow structure with an opening on one side. The second housing 22 covers the opening side of the first housing 21, and combines with the first housing 21 to define the accommodation space 201. For another example, both the first housing 21 and the second housing 22 are a hollow structure with an opening on one side. The opening side of the second housing 22 covers the opening side of the first housing 21, and combines with the first housing 21 to define the accommodation space 201.

Based on the foregoing technical solution, the first housing 21 and the second housing 22 are detachably connected, thereby facilitating the disassembling and assembling operations for the laser assembly 30 in the accommodation space 201, and improving the convenience of use of the processing equipment 100.

Optionally, as shown in FIG. 4 and FIG. 16, the processing equipment 100 may further include a rack 10 configured to connect the rotation roller 20. The first housing 21 is rotatably connected to the rack 10; or the second housing 22 is rotatably connected to the rack 10; or, both the first housing 21 and the second housing 22 are rotatably connected to the rack 10.

In some embodiments, referring to FIG. 4 and FIG. 16, a distribution direction of the first housing 21 and the second housing 22 intersects the first axis L1.

The first housing 21 and the second housing 22 may be sequentially distributed along a radial direction of the rotation roller 20. In other words, the distribution direction of the first housing 21 and the second housing 22 is perpendicular to the first axis L1. For example, as shown in FIG. 16, both the first housing 21 and the second housing 22 are a structure with a semicircular cross section, where the cross section means a cross section perpendicular to the first axis L1. The first axis L1 is located between the first housing 21 and the second housing 22. Definitely, the first housing 21 and the second housing 22 may be distributed along a direction that intersects the radial direction of the rotation roller 20. In other words, the distribution direction of the first housing 21 and the second housing 22 is neither parallel nor perpendicular to the first axis L1.

Based on the foregoing technical scheme, when an axial end of the rotation roller 20 is rotatably connected to the rack 10, the laser assembly 30 can be disassembled without detaching the entire rotation roller 20 from the rack 10, thereby facilitating the use of the processing equipment 100.

In addition, in other embodiments, the first housing 21 and the second housing 22 may be sequentially distributed along an axial direction of the rotation roller 20 instead. For example, the first housing 21 is a cylindrical structure, and an opening is made at an axial end of the first housing 21. The second housing 22 covers the opening side of the first housing 21, so as to combine with the first housing 21 to define the accommodation space 201.

In some embodiments, as shown in FIG. 2 to FIG. 4, the conduit 202 is a linear groove.

Based on the foregoing structure, when the laser assembly 30 drives the laser beam H to move linearly, the movement direction of the laser beam H is parallel to the extension direction of the linear groove.

Based on the foregoing technical solution, the laser assembly 30 drives the laser beam H to be emitted toward the conduit 202. In this way, after the laser beam H is emitted to the sheet 200, the mark formed on the sheet 200 corresponds to the shape of the conduit 202, and is a linear mark. Therefore, by setting the conduit 202 as a linear groove, a linear mark can be made on the sheet 200.

In some embodiments, as shown in FIG. 2 to FIG. 4, the extension direction of the conduit 202 is parallel to the first axis L1.

When the sheet 200 winds around the outer peripheral surface of the rotation roller 20 around the first axis L1 and covers the conduit 202, the laser assembly 30 drives the laser beam H to pass through the conduit 202 so that the laser beam is emitted to the sheet 200. The laser beam H can form a linear mark on the sheet 200. The linear mark is parallel to the first axis L1 and parallel to the width direction of the sheet 200, such as the direction Y shown in FIG. 2 to FIG. 4.

Based on the foregoing structure, when the laser assembly 30 drives the laser beam H to move linearly, the movement direction of the laser beam H is parallel to the first axis L1.

The foregoing technical solution enables the laser beam H to implement transverse marking on the sheet 200.

Optionally, the length of the conduit 202 along the direction Y is greater than the dimension of the sheet 200 along the direction Y. In this way, when the sheet 200 winds around the outer peripheral surface of the rotation roller 20, the conduit 202 protrudes beyond the two ends of the sheet 200 along the direction Y. Such an arrangement enables the laser beam to form a complete linear mark on the surface of the sheet 200.

In some other embodiments, the conduit 202 may also extend along the length direction of the sheet 200, so as to implement the longitudinal marking mentioned above.

In some other embodiments, the conduit 202 may extend along a direction that is neither parallel to the length direction of the sheet 200 nor parallel to the width direction of the sheet 200, so as to implement the angled marking mentioned above.

In some other embodiments, the conduit 202 may be absent in the rotation roller 20, but the rotation roller 20 is a rotation roller 20 capable of transmitting the laser beam H.

The rotation roller 20 is made of a material penetrable by the laser beam, such as but without limitation, a rotating roller 20 made of a transparent material.

Such an arrangement enables the laser beam H to directly pass through the rotation roller 20 so as to be emitted to the sheet 200. This solution is suitable not only for linear marking, but also for marking of complex shapes such as curved marking. In addition, this solution avoids an impact on the marking precision, where the impact is caused by inaccuracy of the laser beam H passing through the conduit 202.

In some embodiments, referring to FIG. 4, the laser assembly 30 includes a fixing bracket 31 and a galvo scanner 32. Both the fixing bracket 31 and the galvo scanner 32 are accommodated inside the accommodation space 201 inside the rotation roller 20. The fixing bracket 31 is disposed inside the rotation roller 20, and the galvo scanner 32 is disposed on the fixing bracket 31. The galvo scanner 32 is configured to reflect the laser beam H to oscillate the laser beam H around the second axis L2.

The galvo scanner 32 is configured to be connected to an external laser system through lightguide. During operation, the external laser system emits a laser beam H, and the galvo scanner 32 receives the laser beam H and reflects the laser beam H to adjust the emission angle of the laser beam H. In this way, the laser beam H is directed toward the conduit 202 at a preset emission angle under the reflection action of the galvo scanner 32, so as to be emitted to the sheet 200 to perform laser marking or laser cutting on the sheet 200.

The galvo scanner 32 is a component capable of reflecting the laser beam H. By reflecting the laser beam H, the galvo scanner 32 can adjust the emission angle of the laser beam H, so as to drive the laser beam H to be emitted at a preset angle. The galvo scanner 32 may be a two-dimensional galvo scanner or a three-dimensional galvo scanner. When the galvo scanner 32 is a two-dimensional galvo scanner, the working principles of the galvo scanner may be learned by reference to the working principles of the first galvo scanner A1 and the second galvo scanner A2 shown in FIG. 1. For example, for a simple galvo scanner 32, a plurality of reflecting mirrors exist inside the galvo scanner 32. The emission angle of the laser beam can be adjusted by adjusting the angles of the plurality of reflecting mirrors, that is, by adjusting the reflecting surfaces of the reflecting mirrors. In this way, by controlling the galvo scanner 32, the galvo scanner 32 is caused to drive the laser beam H to oscillate around the second axis L2, so that the laser beam H forms a mark on the sheet 200.

When the fixing bracket 31 is disposed inside the rotation roller 20 and the galvo scanner 32 is disposed on the fixing bracket 31, both the fixing bracket 31 and the galvo scanner 32 may be fixed against the rotation roller 20. In this way, both the fixing bracket 31 and the galvo scanner 32 are relatively fixed to the rotation roller 20. When the rotation roller 20 rotates around the first axis L1, both the fixing bracket 31 and the galvo scanner 32 can rotate synchronously with the rotation roller 20 around the first axis L1.

Based on the foregoing technical solution, the galvo scanner 32 is fixed onto the rotation roller 20 by the fixing bracket 31, thereby making it convenient to fix the laser assembly 30 onto the rotation roller 20, and in turn, implementing synchronous motion of the laser assembly 30 and the rotation roller 20.

In some embodiments, referring to FIG. 4, the laser assembly 30 further includes a F-Theta field lens 33. The F-Theta field lens 33 is disposed on an emergent side of the galvo scanner 32 and is configured to focus the laser beam H.

When the F-Theta field lens 33 is disposed on the emergent side of the galvo scanner 32, the field lens 33 and the galvo scanner 32 are relatively fixed.

The F-Theta field lens 33 is a component capable of focusing light. Further, the F-Theta field lens 33 is disposed toward the conduit 202. In this way, when the galvo scanner 32 drives the laser beam H to be emitted toward the F-Theta field lens 33, the laser beam H can be emitted toward the conduit 202 under the focusing effect of the F-Theta field lens 33, so as to be emitted to the sheet 200.

Based on the foregoing technical solution, the F-Theta field lens 33 can focus the laser beam H, thereby improving the quality of the mark made by the laser beam H through laser marking or laser cutting on the sheet 200.

In some embodiments, referring to FIG. 2 to FIG. 4, the laser assembly 30 further includes a first optical fiber 34. The first optical fiber 34 is configured to implement lightguide connection between the galvo scanner 32 and an external laser system. The first optical fiber 34 is connected to the galvo scanner 32. The first optical fiber 34 is threaded through the rotation roller 20 to protrude out of the rotation roller 20.

The first optical fiber 34 is connected to the galvo scanner 32 and the external laser system. In this way, when the external laser system emits the laser beam H, the laser beam H can enter the galvo scanner 32 through the first optical fiber 34, with the emission angle changed by the galvo scanner 32, and then pass through the conduits 202 sequentially, so as to be emitted to the sheet 200 to perform laser marking or laser cutting on the sheet 200.

One end of the first optical fiber 34 is connected to the galvo scanner 32. The first optical fiber 34 is threaded through the rotation roller 20 to protrude out of the rotation roller 20 from the accommodation space 201 of the rotation roller 20. In this way, opposite to the other end of the galvo scanner 32, the first optical fiber 34 is connected to the external laser system.

The first optical fiber 34 may be threaded out of the rotation roller 20 from an axial end of the rotation roller 20, or may be threaded out of the rotation roller 20 from a sidewall of the rotation roller 20. It is hereby noted that the position configured to thread out the first optical fiber 34 on the rotation roller 20 is generally not configured to allow winding of the sheet 200, so as to prevent the first optical fiber 34 from interfering with the motion of the sheet 200 or from causing damage to the surface of the sheet 200.

Based on the foregoing technical solution, through arrangement of the first optical fiber 34, lightguide connection is implemented between the galvo scanner 32 and the external laser system, thereby facilitating the galvo scanner 32 to receive the laser beam H emitted by the laser system, so as to implement laser marking or laser cutting. In addition, compared with the solution in which a laser generator is disposed on the rotation roller 20, the foregoing technical solution enables the rotation roller 20 to be more stable during rotation, thereby improving the precision of laser marking or laser cutting for the sheet 200.

In some embodiments, referring to FIG. 2 to FIG. 4, a part that is of the first optical fiber 34 and that is threaded through the rotation roller 20 coincides with the first axis L1.

The part that is of the first optical fiber 34 and that is located between the galvo scanner 32 and the external laser system is threaded through the rotation roller 20. Specifically, as shown in FIG. 2 to FIG. 4, the first optical fiber 34 is threaded out of the rotation roller 20 from the axial end of the rotation roller 20. In addition, the part that is of the first optical fiber 34 and that is threaded through the rotation roller 20 coincides with the first axis L1.

Based on the foregoing technical solution, the part that is of the first optical fiber 34 and that is threaded through the rotation roller 20 coincides with the first axis L1. In this way, a central axis of the part that is of the first optical fiber 34 and that is threaded through the rotation roller 20 coincides with the first axis L1. When the galvo scanner 32 rotates around the first axis L1 along with the rotation roller 20, the first optical fiber 34 also rotates around the first axis L1 along with the galvo scanner 32. That is, the first optical fiber 34 rotates around its own central axis. In this way, the entire first optical fiber 34 can be prevented from oscillating around the first axis L1, thereby maximally preventing the first optical fiber 34 from being entangled, and in turn, simplifying the connection between the first optical fiber 34 and the external laser system, that is, simplifying the light-guide connection between the laser assembly 30 and the external laser system.

Optionally, as shown in FIG. 4, the laser assembly 30 further includes a first plug connector 35 and a second plug connector 36. The first plug connector 35 is connected to the galvo scanner 32, and the second plug connector 36 is connected to the first optical fiber 34. The first plug connector 35 and the second plug connector 36 are plug-fitted to implement connection between the first optical fiber 34 and the galvo scanner 32. The arrangement of the first plug connector 35 and the second plug connector 36 simplifies the operation of connecting the first optical fiber 34 and the galvo scanner 32, thereby improving the convenience of use of the processing equipment 100.

Definitely, in other embodiments, the laser generator of the laser system may be disposed in the rotation roller 20, so that the laser generator can be connected to an external electrical device by a signal cable. In this case, the first optical fiber 34 may be not threaded out of the rotation roller 20, but the signal cable is threaded out of the rotation roller 20 from inside the rotation roller 20. In addition, the part that is of the signal cable and that is threaded through the rotation roller 20 may also coincide with the first axis L1, thereby also facilitating rotation of the rotation roller 20 and maximally avoiding entanglement of the signal cable.

In some embodiments, referring to FIG. 4, the laser assembly 30 further includes a cable 37. The cable 37 is connected to the galvo scanner 32. The cable 37 is threaded through the rotation roller 20 to protrude out of the rotation roller 20.

The cable 37 is configured to connect the galvo scanner 32 and an external control system. The external control system can control the motion of components such as a reflecting mirror in the galvo scanner 32, so that the galvo scanner 32 can adjust the emission angle of the laser.

One end of the cable 37 is connected to the galvo scanner 32. The cable 37 is threaded through the rotation roller 20 to protrude out of the rotation roller 20 from the accommodation space 201 of the rotation roller 20. In this way, opposite to the other end of the galvo scanner 32, the cable 37 is connected to the external control system, thereby implementing electrical connection between the galvo scanner 32 and the external control system.

In some embodiments, referring to FIG. 4, a part that is of the cable 37 and that is threaded through the rotation roller 20 coincides with the first axis L1. Specifically, the part that is of the cable 37 and that is located between the galvo scanner 32 and the external control system is threaded through the rotation roller 20. In addition, the part that is of the cable 37 and that is threaded through the rotation roller 20 coincides with the first axis L1.

The connection method between the cable 37 and the galvo scanner 32 may be learned by reference to the connection method between the first optical fiber 34 and the galvo scanner 32, details of which are omitted here.

Based on the foregoing technical solution, the part that is of the cable 37 and that is threaded through the rotation roller 20 coincides with the first axis L1. In this way, a central axis of the part that is of the cable 37 and that is threaded through the rotation roller 20 coincides with the first axis L1. When the galvo scanner 32 rotates around the first axis L1 along with the rotation roller 20, the cable 37 also rotates around the first axis L1 along with the galvo scanner 32. That is, the cable 37 rotates around its own central axis. In this way, the entire cable 37 can be prevented from oscillating around the first axis L1, thereby maximally preventing the cable 37 from being entangled, and in turn, simplifying the connection between the cable 37 and the external laser system, that is, simplifying the lightguide connection between the laser assembly 30 and the external laser system.

Figure 12:
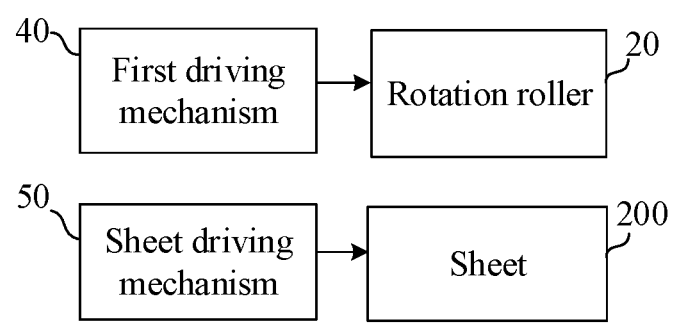
FIG. 12 is a schematic diagram of control of a piece of processing equipment according to some embodiments of this application.

In some embodiments, referring to FIG. 2 and FIG. 12, the processing equipment 100 further includes a rack 10, a first driving mechanism 40, and a sheet driving mechanism 50. The first driving mechanism 40 is disposed on the rack 10 and configured to drive the rotation roller 20 to rotate. The sheet driving mechanism 50 is disposed on the rack 10 and configured to drive the sheet 200 to move. In addition, the first driving mechanism 40 and the sheet driving mechanism 50 are configured to make a rotating linear speed of the rotation roller 20 identical to a motion speed of the sheet 200.

The bracket 10 means an overall framework of the processing equipment 100, and is primarily configured to make the rotation roller 20, the laser assembly 30, and the like of the processing equipment 100 into a whole, so that the processing equipment 100 is structurally a whole to some extent. In practical applications, the rack 10 may be mounted on a plane so that the processing equipment 100 is be mounted on a plane for use. The rack 10 may be fixed onto a wall instead, so that the processing equipment 100 is fixed onto the wall for use. In addition, the rack 10 may be disposed at another position, so that the processing equipment 100 is put into use at other positions.

The rack 10 mentioned here and the rack 10 mentioned in the foregoing embodiments may be of the same structure.

The first driving mechanism 40 is a mechanism capable of driving the rotation roller 20 to rotate. The rotation roller 20 is connected to an output end of the first driving mechanism 40. Driven by the first driving mechanism 40, the rotation roller 20 can rotate around the first axis L1 due to the driving by the first driving mechanism 40. For example, the first driving mechanism 40 may be a motor. Alternatively, the first driving mechanism 40 may be a combination of a motor and a gear cluster working together. Specifically, the gear cluster includes a plurality of gears that mesh with each other in sequence. One of the gears is connected to an output shaft of the motor, and another gear is connected to the rotation roller 20. When the motor is started, a driving force of the motor can be transmitted to the rotation roller 20 through a plurality of gears of the gear cluster sequentially. Definitely, the first driving mechanism 40 may be in other forms, which are not enumerated here exhaustively.

The sheet driving mechanism 50 is a mechanism capable of driving the sheet 200 to move. For example, the sheet driving mechanism 50 includes an unwinding mechanism and a rewinding mechanism. The sheet 200 is wound on the unwinding mechanism and the rewinding mechanism separately. A part that is of the sheet 200 and that is located between the unwinding mechanism and the rewinding mechanism is wound around the outer peripheral surface of the rotation roller 20 around the first axis L1. During operation, the rewinding mechanism performs an rewinding operation on the sheet 200, and the unwinding mechanism performs an unwinding operation on the sheet 200. In this way, the sheet 200 located between the rewinding mechanism and the unwinding mechanism passes through the rotation roller 20 continuously to implement motion of the sheet 200. Definitely, the sheet driving mechanism 50 may be in other forms, which are not enumerated here exhaustively.

The first driving mechanism 40 and the sheet driving mechanism 50 can perform synchronous driving to make a rotating linear speed of the rotation roller 20 identical to a motion speed of the sheet 200. In this way, the sheet 200 moving to the rotation roller 20 can move synchronously with the rotation roller 20 around the first axis L1.

Based on the foregoing technical solution, both the rotation roller 20 and the sheet 200 can be driven by the corresponding driving mechanism. On the one hand, both the rotation roller 20 and the sheet 200 can be driven stably, thereby implementing a stable motion effect. On the other hand, the first driving mechanism 40 and the sheet driving mechanism 50 are controlled so that the rotation linear speed of the rotation roller 20 is identical to the motion speed of the sheet 200, thereby maximally improving motion synchronism between the sheet 200 around the outer peripheral surface of the rotation roller 20 and the rotation roller 20, and improving precision of laser marking or laser cutting.

Optionally, in some embodiments, as shown in FIG. 2 to FIG. 4, the rotation roller 20 is rotatably connected to the rack 10. One end or two opposite ends of the rotation roller 20 along the axial direction are rotatably connected to the rack 10, so that the rotation roller 20 can rotate against the rack 10. Moreover, the connection between the end of the rotation roller 20 and the rack 10 can maximally prevent a junction between the rotation roller 20 and the rack 10 from interfering with the sheet 200.

Optionally, as shown in FIG. 2, the rack 10 includes a rack body 11 and two connecting arms 12 spaced out on the rack body 11. The rotation roller 20 is disposed between the two connecting arms 12. The two axial ends of the rotation roller 20 are rotatably connected to the two connecting arms 12 in one-to-one correspondence, so that the rotation roller 20 can stably rotate against the rack 10.

Optionally, as shown in FIG. 2, a bearing may be disposed between the connecting arm 12 and the rotation roller 20. Specifically, an outer ring of the bearing is fixed to the connecting arm 12. A connecting shaft is disposed at both axial ends of the rotation roller 20. The connecting shaft is fixed to an inner ring of the bearing. In this way, when the rotation roller 20 rotates, the connecting shaft can rotate against the connecting arm 12 through the bearing to improve the rotation stability of the rotation roller 20 against the rack 10.

Figure 14:
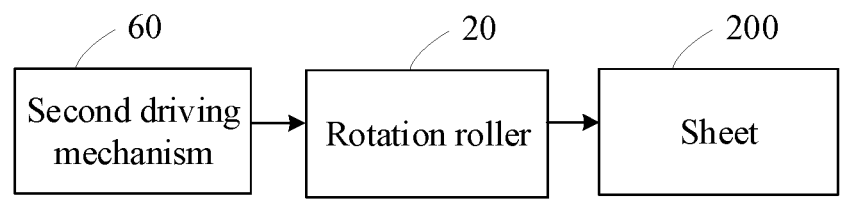
FIG. 14 is a schematic diagram of control of a piece of processing equipment according to some other embodiments of this application.

In some embodiments, referring to FIG. 2 and FIG. 14, the processing equipment 100 further includes a second driving mechanism 60. The second driving mechanism 60 is configured to drive the rotation roller 20 to rotate. The rotation roller 20 is configured to roll-feed the sheet 200 during rotation.

The second driving mechanism 60 is a mechanism configured to drive the rotation roller 20 to rotate around the first axis L1. The rotation roller 20 is connected to an output end of the second driving mechanism 60. In this way, driven by the second driving mechanism 60, the rotation roller 20 can rotate around the first axis L1 due to the driving by the second driving mechanism 60. For example, the second driving mechanism 60 may be a motor. Alternatively, the second driving mechanism 60 may be a combination of a motor and a gear cluster working together. Specifically, the gear cluster includes a plurality of gears that mesh with each other in sequence. One of the gears is connected to an output shaft of the motor, and another gear is connected to the rotation roller 20. When the motor is started, a driving force of the motor can be transmitted to the rotation roller 20 through a plurality of gears of the gear cluster sequentially. Definitely, the second driving mechanism 60 may be in other forms, which are not enumerated here exhaustively. The second driving mechanism 60 may be a driving mechanism identical to the first driving mechanism 40 mentioned in the preceding embodiment.

When the rotation roller 20 rotates around the first axis L1, the rotation roller 20 roll-feeds the sheet 200 that winds around the outer peripheral surface of the rotation roller 20. In this way, the sheet 200 that winds around the outer peripheral surface of the rotation roller 20 around the first axis L1 also moves synchronously with the rotation roller 20, thereby implementing synchronous motion of the sheet 200 and the laser assembly 30.

The outer peripheral surface of the rotation roller 20 around the first axis L1 may be in frictional contact with the surface of the sheet 200. In this way, when the rotation roller 20 rotates, the rotation roller 20 can drive the sheet 200 around the outer peripheral surface of the rotation roller 20 to move.

Based on the foregoing technical solution, the second driving mechanism 60 drives the rotation roller 20 to rotate around the first axis L1. During rotation, the rotation roller 20 can roll-feed the sheet 200, thereby implementing synchronous motion of the rotation roller 20 and the sheet 200 around the first axis L1, and in turn, reducing design of the driving mechanism and simplifying the control complexity of the processing equipment 100.

In addition, in some other embodiments, the sheet 200 may drive the rotation roller 20 to rotate during motion.

Figure 15:
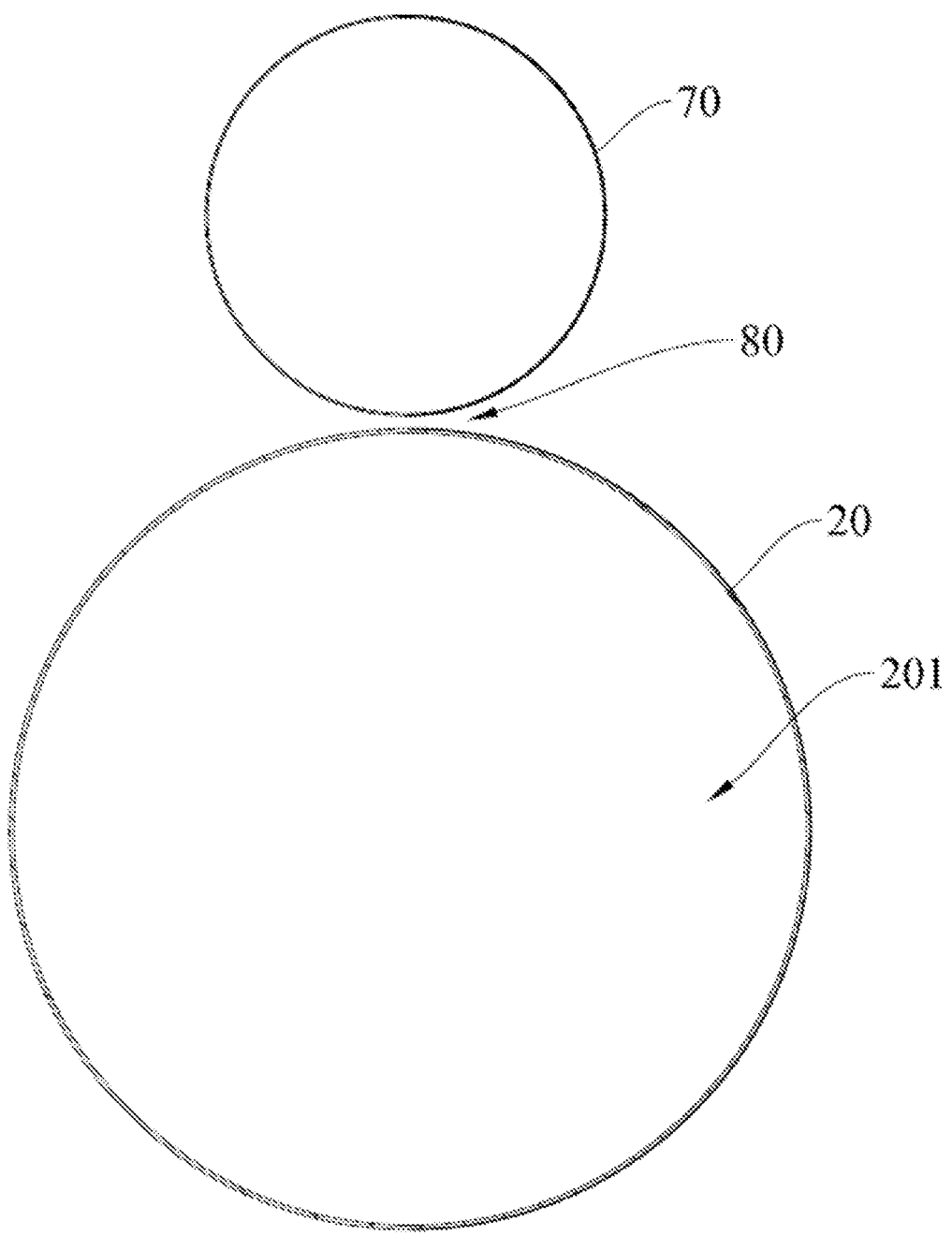
FIG. 15 is a schematic view of a fit between a rotation roller and a pressure roller according to some embodiments of this application.

In some embodiments, referring to FIG. 14 and FIG. 15, the processing equipment 100 further includes a pressure roller 70. The pressure roller 70 can rotate around an axis parallel to the first axis L1. A rotation direction of the pressure roller 70 is opposite to a rotation direction of the rotation roller 20. A motion channel 80 that allows passage of the sheet 200 exists between the rotation roller 20 and the pressure roller 70.

The pressure roller 70 is a columnar structure with an outer peripheral surface being a cylindrical surface. The pressure roller 70 and the rotation roller 20 are arranged in parallel. Understandably, a central axis of the pressure roller 70 is parallel to a central axis of the rotation roller 20. Moreover, the pressure roller 70 is disposed on one side of the rotation roller 20. The outer peripheral surface of the pressure roller 70 and the outer peripheral surface of the rotation roller 20 are spaced apart to form the motion channel 80.

When the processing equipment 100 is in operation, the sheet 200 passes through the motion channel 80 formed by the spacing between the rotation roller 20 and the pressure roller 70. The rotation roller 20 rotates around its central axis, and the pressure roller 70 also rotates around its central axis. The rotation direction of the rotation roller 20 is opposite to the rotation direction of the pressure roller 70. In this way, the rotation roller 20 and the pressure roller 70 can jointly roll-feed the sheet 200 so that the sheet 200 passes through the motion channel 80 continuously; or, the sheet 200 can be in closer contact with the rotation roller 20 in the motion channel 80, that is, the sheet 200 can be in closer contact and fit with the rotation roller 20 under the action of the pressure roller 70, thereby driving the rotation roller 20 to rotate during motion.

Detailed description of the driving mechanism configured to drive the pressure roller 70 to rotate may be learned by reference to the first driving mechanism 40 and the second driving mechanism 60 described above, and is omitted here.

Frictional contact may be implemented between the outer peripheral surface of the pressure roller 70 and the sheet 200. In this way, the pressure roller 70 works together with the rotation roller 20 to roll-feed the sheet 200 during rotation, or the sheet 200 can drive the rotation roller 20 to rotate.

Based on the foregoing technical solution, the pressure roller 70 and the rotation roller 20 jointly roll-feed the sheet 200, or the sheet 200 more stably drives the rotation roller 20 to rotate under the action of the pressure roller 70, thereby increasing a roll-feeding force of the rotation roller 20 on the sheet 200 or the driving stability of the rotation roller 20 for the sheet 200, and improving the motion synchronism between the sheet 200 and the rotation roller 20, and in turn, improving the precision of laser marking or laser cutting for the sheet 200.

Figure 13:
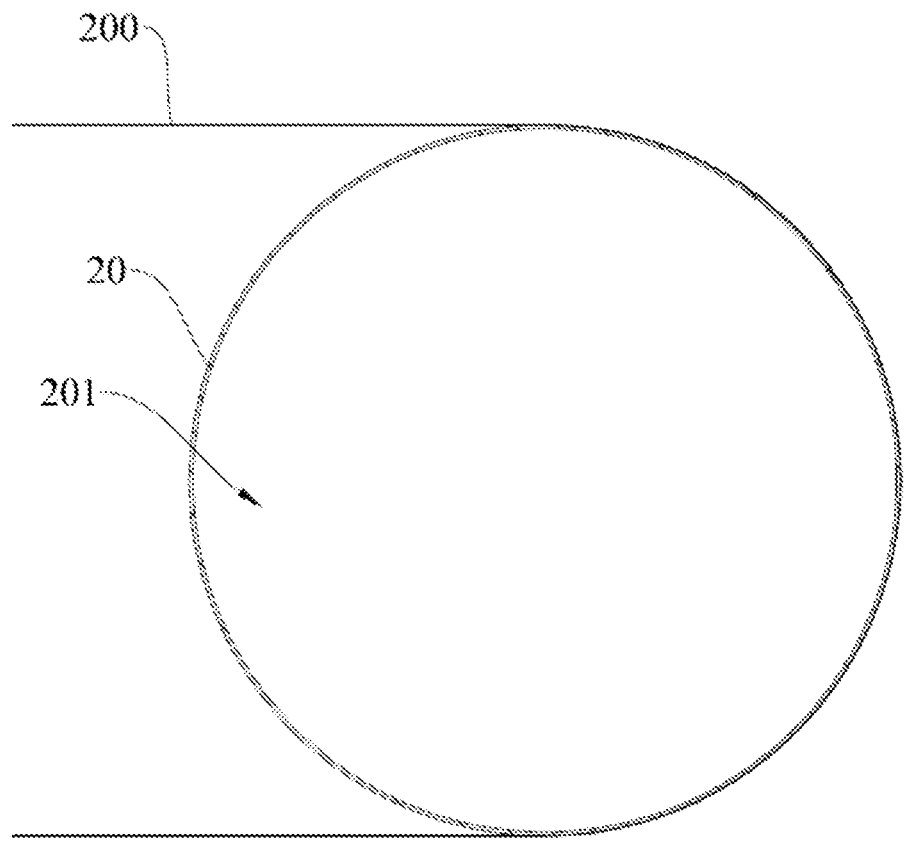
FIG. 13 is a sectional view of a fit between a rotation roller and a sheet according to some embodiments of this application.

In some embodiments, referring to FIG. 2, FIG. 12, and FIG. 13, the processing equipment further includes a sheet driving mechanism 50. The sheet driving mechanism 50 is configured to drive the sheet 200 to move and is configured in such a way that, on a cross section perpendicular to the first axis L1, the sheet 200 winds around at least a half of the outer peripheral surface of the rotation roller 20.

The sheet driving mechanism 50 in this embodiment may be identical to the sheet driving mechanism 50 mentioned in the preceding embodiment, details of which are omitted here.

FIG. 13 is a schematic diagram that shows a fit between a rotation roller 20 and a sheet 200 on a cross section perpendicular to the first axis L1. in FIG. 13, the sheet 200 winds around a half of the outer peripheral surface of the rotation roller 20. In other words, in FIG. 13, the sheet 200 contacts a half of the outer peripheral surface of the rotation roller 20. Alternatively, in other embodiments, according to the viewing angle shown in FIG. 13, the sheet 200 may contact more than a half of the outer peripheral surface of the rotation roller 20.

The foregoing technical solution enables the rotation roller 20 to contact the sheet 200 by a relatively large area of the outer peripheral surface around the first axis L1, thereby increasing a contact area between the sheet 200 and the rotation roller 20 to increase the friction between the sheet 200 and the rotation roller 20, and in turn, improving motion synchronism between the rotation roller 20 and the sheet 200 around the rotation roller 20, and improving the precision of laser marking or laser cutting for the sheet 200.

In some embodiments, the outer peripheral surface of the rotation roller 20 is set as a surface that moves synchronously with the sheet 200 through friction.

The outer peripheral surface of the rotation roller 20 may be frosted or textured to increase the roughness of the outer peripheral surface of the rotation roller 20. In this way, during rotation of the rotation roller 20, the outer peripheral surface of the rotation roller 20 can drive, through friction, the sheet 200 to move synchronously; or, when in motion, the sheet 200 can drive the rotation roller 20 to rotate. The operations such as frosting and texturing for the purpose of increasing the roughness of the outer peripheral surface for the rotation roller 20 need to prevent the treated outer peripheral surface of the rotation roller 20 from damaging the sheet 200 wound around the outer peripheral surface of the rotation roller 20. In other words, when treating the outer peripheral surface of the rotation roller 20, it is necessary to increase the friction between the outer peripheral surface of the rotation roller 20 and the sheet 200 but without leaving the outer peripheral surface of the rotation roller 20 to damage the sheet 200.

The foregoing technical solution maximally avoids the problem of slippage of the sheet 200 against the rotation roller 20, improves motion synchronism between the sheet 200 and the rotation roller 20 around the first axis L1, and in turn, improves the precision of laser marking or laser cutting.

Figure 17:
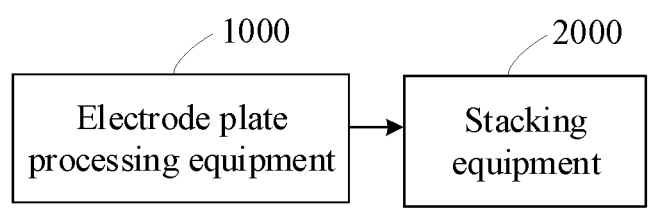
FIG. 17 is a schematic diagram of a piece of battery processing equipment according to some embodiments of this application.

Referring to FIG. 2 to FIG. 4 together with FIG. 17, a second aspect of this application provides a piece of electrode plate processing equipment 1000. The electrode plate processing equipment 1000 includes the foregoing processing equipment 100. The processing equipment 100 according to this embodiment is identical to the processing equipment 100 mentioned in the preceding embodiment, details of which are omitted here and may be learned by reference.

Understandably, in this embodiment, an electrode plate may be equivalent to the sheet 200 mentioned in the preceding embodiment. The electrode plate processing equipment 1000 is primarily configured to process the electrode plate, so as to perform laser marking or laser cutting operations on the electrode plate.

Based on the foregoing technical solution, this embodiment employs the processing equipment 100 mentioned in the preceding embodiment, and therefore, also achieves the advantages of high motion synchronism between the laser beam H and the electrode plate, high precision of laser marking and laser cutting, and high efficiency. For how the specific advantages are manifested, reference may be made to the description in the preceding embodiment, and details are omitted here.

Referring to FIG. 2 to FIG. 4 together with FIG. 17, a third aspect of this application provides a piece of battery processing equipment. The battery processing equipment includes the electrode plate processing equipment 1000 and a piece of stacking equipment 2000. The electrode plate processing equipment 1000 is configured to perform laser marking on an electrode plate, so as to make a mark on the electrode plate. The stacking equipment 2000 is configured to stack the electrode plate along the mark. The electrode plate processing equipment 1000 according to this embodiment is identical to the electrode plate processing equipment 1000 mentioned in the preceding embodiment, details of which are omitted here and may be learned by reference.

The stacking equipment 2000 is equipment configured to fold an electrode plate so as to stack the electrode plate to form an electrode assembly. Specifically, in this embodiment, when the stacking equipment 2000 stacks the electrode plate, the electrode plate is folded along the mark parallel to the first axis L1, and then stacked to form an electrode assembly.

The electrode assembly is a component that reacts electrochemically in a battery, and is primarily formed by stacking electrode plates. The electrode plate mentioned here includes a positive electrode plate and a negative electrode plate, and a separator is disposed between the positive electrode plate and the negative electrode plate stacked.

In addition, the battery processing equipment may further include a piece of assembling equipment configured to fit the electrode assembly into a housing to form a battery, where the electrode assembly is formed by the stacking equipment 2000 through stacking.

Based on the foregoing technical solution, the battery processing equipment can make laser marks on the electrode plate. In this way, during stacking of the electrode plate, the electrode plate can be folded along the mark, so as to be stacked to form an electrode assembly, thereby speeding up the battery processing and improving the processing efficiency of the battery. In addition, the battery processing equipment employs the electrode plate processing equipment 1000 mentioned in the preceding embodiment, and therefore, improves the precision of laser marking for electrode plates, thereby improving the stacking efficiency of electrode plates and the quality of an electrode assembly formed by stacking the electrode plates.

Figure 18:
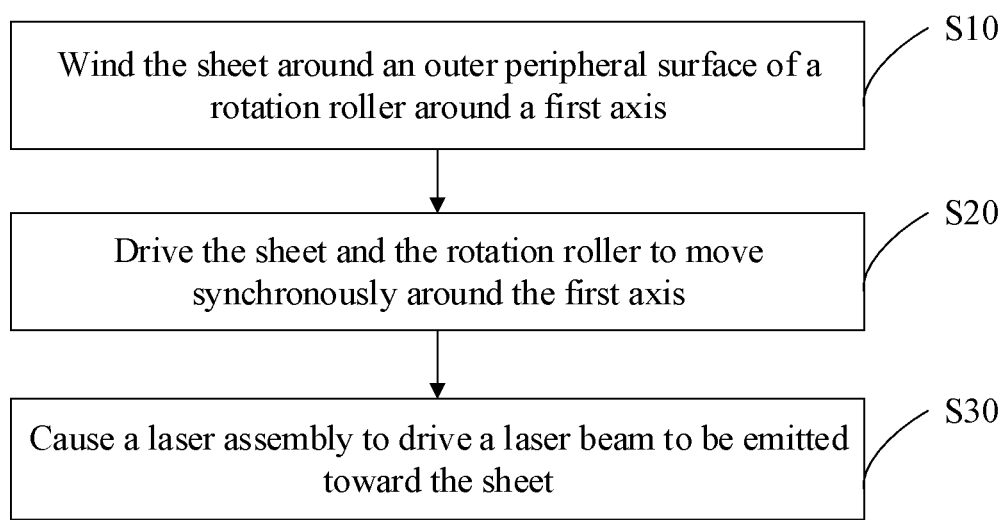
FIG. 18 is a flowchart of a sheet processing method according to some embodiments of this application.

Referring to FIG. 2 to FIG. 4 together with FIG. 18, a fourth aspect of this application provides a sheet processing method. The sheet processing method is applicable to processing equipment 100 and includes the following steps:

S10: Winding the sheet 200 around an outer peripheral surface of a rotation roller 20 around a first axis L1.

In a case that a conduit 202 is made in the rotation roller 20, it is necessary to make the sheet 200 cover at least a part of the conduit 202. In this way, when a laser assembly 30 drives a laser beam H to be emitted toward the conduit 202, the laser beam H can pass through the conduit 202 and be emitted to the sheet 200, thereby forming marks (preset marks) of laser marking or laser cutting on the sheet 200.

S20: Driving the sheet 200 and the rotation roller 20 to move synchronously around the first axis L1.

The motion speed of the sheet 200 is controlled in the same way as controlling the rotating linear speed of the rotation roller 20. Specifically, the first driving mechanism 40 and the sheet driving mechanism 50 may drive the rotation roller 20 and the sheet 200 respectively to move, or the second driving mechanism 60 may drive the rotation roller 20 to rotate, so that the rotation roller 20 roll-feeds the sheet 200. In addition, with the sheet 200 driven to move, the sheet 200 drives the rotation roller 20 to rotate, thereby implementing motion synchronism between the sheet 200 and the rotation roller 20. In this way, the part that is of the sheet 200 and that winds around the outer peripheral surface of the rotation roller 20 move synchronously with the rotation roller 20 around the first axis L1, and therefore, the part that is of the sheet 200 and that winds around the outer peripheral surface of the rotation roller 20 can move synchronously with the laser assembly 30.

S30: Causing a laser assembly 30 to drive a laser beam H to be emitted toward the sheet 200.

When the laser assembly 30 drives the laser beam H to be emitted toward the sheet 200, the laser assembly 30 can drive the laser beam H to oscillate around the second axis L2, thereby tuning the emission angle of the laser beam, and making the laser beam H form a preset mark on the sheet 200. Alternatively, the laser assembly 30 may drive the laser beam H to move linearly so that the laser beam H forms a preset mark on the sheet 200. Alternatively, the laser assembly 30 may, depending on actual requirements, alternately drive the laser beam H to oscillate around the second axis L2 and drive the laser beam H to move linearly, thereby making the laser beam H form a preset mark on the sheet 200.

In a case that a conduit 202 is made in the rotation roller 20, the laser assembly 30 needs to drive the laser beam H to be emitted toward the conduit 202, so that the laser beam H passes through conduit 202 and is emitted to the sheet 200.

Based on the foregoing technical solution, when the rotation roller 20 rotates around the first axis L1, the laser assembly 30 rotates synchronously with the rotation roller 20 around the first axis L1, so that the laser beam H can move synchronously with the sheet 200. In this way, a light spot of the laser beam H acting on the sheet 200 is basically prevented from deviating from a preset position, thereby implementing the effect of "static marking". At the same time, the laser beam H oscillates around the second axis L2 at a preset angle and in a preset direction, or the laser beam H moves linearly in a preset direction, so that the laser beam H can form a preset mark on the sheet 200 while moving along with the sheet 200. In this way, the processing equipment 100 just needs to drive the laser beam H to oscillate around the second axis L2, or drive the laser beam H to move linearly, or alternately drive the laser beam H to oscillate and drive the laser beam H to move linearly, so as to implement laser marking or laser cutting, thereby improving the precision and efficiency of laser marking.

In some embodiments, referring to FIG. 13 and FIG. 18, step S10 includes the following step:

S11: Winding, on a cross section perpendicular to the first axis L1, the sheet 200 around at least a half of the outer peripheral surface of the rotation roller 20.

The foregoing technical solution increases a contact area between the surface of the sheet 200 and the outer peripheral surface of the rotation roller 20, and increases the friction between the sheet 200 and the rotation roller 20, thereby improving motion synchronism between the sheet 200 and the rotation roller 20, and in turn, improving the precision of laser marking or laser cutting.

What is described above is merely optional embodiments of this application, but not intended to limit this application. To a person skilled in the art, various modifications and variations may be made to this application. Any modifications, equivalent replacements, improvements, and the like made without departing from the spirit and principles of this application still fall within the protection scope of claims of this application.

What is claimed is:

1. A piece of processing equipment, comprising:
   a rotation roller, rotatable around a first axis, wherein an outer peripheral surface of the rotation roller around the first axis is configured to allow winding of a sheet, and the outer peripheral surface of the rotation roller is configured to move synchronously with the sheet around the first axis; and
   a laser assembly, disposed on the rotation roller and configured to rotate with the rotation roller, wherein the laser assembly is configured to drive a laser beam to be emitted toward the sheet, and further configured to drive the laser beam to move linearly and/or oscillate around a second axis that intersects the first axis,
   wherein the laser assembly comprises a fixing bracket disposed in the rotation roller and a galvo scanner disposed on the fixing bracket, and the galvo scanner is configured to reflect the laser beam to oscillate the laser beam around the second axis, and
   the laser assembly further comprises a first optical fiber connected to the galvo scanner, and the first optical fiber is threaded through the rotation roller to protrude out of the rotation roller.

2. The processing equipment according to claim 1, wherein the first axis and the second axis intersect to define a first plane, and the laser assembly is configured to drive the laser beam to oscillate in the first plane.

3. The processing equipment according to claim 1, wherein the first axis and the second axis are straight lines that are in different planes, the laser assembly is configured to drive the laser beam to oscillate in a second plane, the second plane is a plane defined by the second axis and a third axis, and the third axis is a straight line parallel to the first axis and intersecting the second axis.

4. The processing equipment according to claim 1, wherein the laser assembly is configured to drive the laser beam to oscillate in a third plane, and the third plane is a plane passing through the second axis and intersecting the first axis.

5. The processing equipment according to claim 1, wherein the laser assembly is disposed inside the rotation roller, and a conduit that allows passage of the laser beam is made in the rotation roller.

6. The processing equipment according to claim 5, wherein the conduit is plural in number, and the plurality of conduits are spaced out in the rotation roller.

7. The processing equipment according to claim 6, wherein the laser assembly is configured to drive the laser beam to be emitted to a plurality of conduits sequentially; or, the laser assembly is plural in number, and the plurality of laser assemblies are configured to drive the laser beam to be emitted to the corresponding conduits.

8. The processing equipment according to claim 5, wherein the rotation roller comprises a first housing and a second housing, the second housing is detachably connected to the first housing and combines with the first housing to jointly define an accommodation space configured to accommodate the laser assembly, and the conduit is made in the first housing and/or the second housing and communicates with the accommodation space.

9. The processing equipment according to claim 8, wherein a distribution direction of the first housing and the second housing intersects the first axis.

10. The processing equipment according to claim 5, wherein the conduit is a linear groove.

11. The processing equipment according to claim 10, wherein an extension direction of the linear groove is parallel to the first axis.

12. The processing equipment according to claim 1, wherein the rotation roller is capable of transmitting the laser beam.

13. The processing equipment according to claim 1, wherein a part that is of the first optical fiber and that is threaded through the rotation roller coincides with the first axis.

14. The processing equipment according to claim 1, wherein the processing equipment further comprises:

a rack;

a first driver to drive the rotation roller to rotate; and a sheet driver to drive the sheet to move, wherein the first driver and the sheet driver are configured to make a rotating linear speed of the rotation roller identical to a motion speed of the sheet.

15. The processing equipment according to claim 1, wherein the processing equipment further comprises a second driver, the second driver is configured to drive the rotation roller to rotate, and the rotation roller is configured to roll-feed the sheet during rotation.

16. The processing equipment according to claim 1, wherein the processing equipment further comprises a pressure roller, the pressure roller is configured to rotate around an axis parallel to the first axis, a rotation direction of the pressure roller is opposite to a rotation direction of the rotation roller, and a motion channel that allows passage of the sheet exists between the rotation roller and the pressure roller.

17. The processing equipment according to claim 1, wherein the processing equipment further comprises a sheet driver, the sheet driver is configured to drive the sheet to move and is configured in such a way that, on a cross section perpendicular to the first axis, the sheet winds around at least a half of the outer peripheral surface of the rotation roller.

18. The processing equipment according to claim 1, wherein the outer peripheral surface of the rotation roller is set as a surface that moves synchronously with the sheet through friction.

* * * * *